US011120058B2

(12) United States Patent
Paulsen et al.

(10) Patent No.: US 11,120,058 B2
(45) Date of Patent: Sep. 14, 2021

(54) GENERATING AND PROVIDING STACKED ATTRIBUTION BREAKDOWNS WITHIN A STACKED ATTRIBUTION INTERFACE BY APPLYING ATTRIBUTION MODELS TO DIMENSIONS OF A DIGITAL CONTENT CAMPAIGN

(71) Applicant: Adobe Inc., San Jose, CA (US)

(72) Inventors: Trevor Paulsen, Lehi, UT (US);
Nathan Purser, Highland, UT (US);
David Wilcox, Lehi, UT (US)

(73) Assignee: Adobe Inc., San Jose, CA (US)

( * ) Notice: Subject to any disclaimer, the term of this patent is extended or adjusted under 35 U.S.C. 154(b) by 290 days.

(21) Appl. No.: 16/166,806

(22) Filed: Oct. 22, 2018

(65) Prior Publication Data

US 2020/0125675 A1 Apr. 23, 2020

(51) Int. Cl.
*G06F 16/332* (2019.01)
*G06F 3/0482* (2013.01)
*G06Q 30/02* (2012.01)
*G06F 16/901* (2019.01)

(52) U.S. Cl.
CPC ........ *G06F 16/3328* (2019.01); *G06F 3/0482* (2013.01); *G06F 16/9024* (2019.01); *G06Q 30/0201* (2013.01)

(58) Field of Classification Search
CPC .................................................. G06F 16/3328
See application file for complete search history.

(56) References Cited

U.S. PATENT DOCUMENTS

| 7,212,625 | B1 | 5/2007 | McKenna et al. |
| 9,697,316 | B1 | 7/2017 | Taylor et al. |
| 10,169,778 | B1 | 1/2019 | Collin et al. |
| 10,332,156 | B2 | 6/2019 | Buchalter et al. |
| 10,599,642 | B1 | 3/2020 | Hawes et al. |
| 10,659,403 | B2 | 5/2020 | Smullen et al. |
| 10,970,338 | B2 | 4/2021 | Paulsen et al. |
| 2002/0116249 | A1 | 8/2002 | Ellinger et al. |
| 2007/0198505 | A1 | 8/2007 | Fuller |
| 2008/0288889 | A1 | 11/2008 | Hunt et al. |
| 2010/0217650 | A1 | 8/2010 | Hartnell |

(Continued)

OTHER PUBLICATIONS

U.S. Appl. No. 16/189,739, Aug. 6, 2020, Office Action.

(Continued)

*Primary Examiner* — Van H Oberly
(74) *Attorney, Agent, or Firm* — Keller Jolley Preece

(57) ABSTRACT

The present disclosure relates to systems, methods, and non-transitory computer readable media for generating and providing stacked attribution distributions within a stacked attribution user interface. For example, the disclosed systems can utilize attribution models to generate stacked attribution distributions as breakdowns of other attribution distributions. The disclosed systems can further provide a stacked attribution user interface that includes selectable elements for identifying event categories, dimensions, and attribution models for generating stacked attribution distributions. Based on user interaction with these selectable elements, the disclosed systems can dynamically generate, provide, and modify attribution breakdowns via the stacked attribution interface.

20 Claims, 14 Drawing Sheets

(56) References Cited

U.S. PATENT DOCUMENTS

| | | |
|---|---|---|
| 2011/0302025 A1 | 12/2011 | Hsiao et al. |
| 2011/0320715 A1 | 12/2011 | Ickman et al. |
| 2012/0046996 A1 | 2/2012 | Shah et al. |
| 2012/0226527 A1 | 9/2012 | Carwile, Jr. et al. |
| 2012/0303447 A1* | 11/2012 | Hughes .............. G06Q 30/0255 705/14.46 |
| 2013/0035975 A1 | 2/2013 | Cavander et al. |
| 2013/0301820 A1 | 11/2013 | Williams et al. |
| 2014/0195339 A1* | 7/2014 | Paulsen .............. G06Q 30/0247 705/14.46 |
| 2014/0244345 A1 | 8/2014 | Sollis et al. |
| 2014/0279057 A1 | 9/2014 | Shepherd et al. |
| 2015/0032725 A1 | 1/2015 | Barykin et al. |
| 2015/0046828 A1 | 2/2015 | Desai et al. |
| 2015/0161652 A1* | 6/2015 | Schnabl ............. G06Q 30/0242 705/14.41 |
| 2016/0042388 A1 | 2/2016 | Chater |
| 2016/0098735 A1 | 4/2016 | Sinha et al. |
| 2016/0283969 A1* | 9/2016 | Chalimadugu ......... H04L 51/10 |
| 2017/0017971 A1 | 1/2017 | Moreau et al. |
| 2017/0039577 A1 | 2/2017 | Gauthier et al. |
| 2017/0180284 A1 | 6/2017 | Smullen et al. |
| 2017/0213237 A1 | 7/2017 | Yadagiri et al. |
| 2017/0323330 A1 | 11/2017 | Chittilappilly et al. |
| 2017/0337588 A1 | 11/2017 | Chittilappilly et al. |
| 2018/0096417 A1 | 4/2018 | Cook et al. |
| 2018/0308123 A1 | 10/2018 | Zhong et al. |
| 2018/0336640 A1 | 11/2018 | Dziabiak et al. |
| 2019/0130040 A1 | 5/2019 | Ma et al. |
| 2020/0082442 A1 | 3/2020 | Sotomayor |

OTHER PUBLICATIONS

U.S. Appl. No. 16/189,739, Dec. 14, 2020, Notice of Allowance.
U.S. Appl. No. 16/189,812, Jan. 8, 2021, Office Action.
U.S. Appl. No. 16/167,143, May 26, 2021, Preinterview 1st Office Action.
U.S. Appl. No. 16/189,784, May 21, 2021, Office Action.
U.S. Appl. No. 16/167,143, Jul. 14, 2021, 1st Office Action.
U.S. Appl. No. 16/189,812, Jul. 1, 2021, Office Action.

* cited by examiner

GENERATING AND PROVIDING STACKED ATTRIBUTION BREAKDOWNS WITHIN A STACKED ATTRIBUTION INTERFACE BY APPLYING ATTRIBUTION MODELS TO DIMENSIONS OF A DIGITAL CONTENT CAMPAIGN

BACKGROUND

Advancements in software and hardware platforms have provided a variety of improvements in systems that enable digital content providers to manage campaigns for generating, providing, and distributing digital content across client devices. For example, digital campaign management systems are now able to provide visualizations on various events that lead to the success of a particular campaign— e.g., by determining attributions of those events. Amid efforts to improve these digital campaign analysis systems, some systems can, for example, determine a percentage of purchases that result from various user actions in relation to certain distribution channels such as email, social networks, or paid searches.

Despite these advances however, conventional digital campaign analysis systems continue to suffer from a number of disadvantages, particularly in their accuracy, efficiency, and flexibility. For example, although many conventional digital campaign analysis systems can attribute certain events (e.g., clicks, purchases, etc.) to various distribution channels, these systems nevertheless generate such attributions on a broad level, without providing insight into the events or distribution channels themselves. Thus, many of these systems fail to provide the necessary granularity of information to determine, on a more detailed level, how events should be attributed. Therefore, these systems often generate an inaccurate picture of how particular events are attributed, which can lead to misguided action by systems that generate or provide digital content on behalf of a digital content provider.

Conventional digital campaign analysis systems are also inefficient. In particular, many conventional systems require an inordinate number of user interactions to generate and/or access desired data or functionality related to attribution reports. For example, these systems often generate attribution reports in a compartmentalized fashion, where reports are generated independently of each other, thereby requiring onerous action on the part of a user to navigate between separate report interfaces and determine relationships between attribution and other analytics information.

In addition, some conventional digital campaign analysis systems are inflexible. For example, some systems require pre-generated or pre-configured parameters to run an analysis on a particular campaign. To illustrate, conventional systems often require an administrator or other user to set or otherwise determine which events (e.g., clicks, orders, etc.) to track and which values (e.g., distribution channels) to monitor for such events. Indeed, many conventional digital campaign analysis systems are only capable of generating reports based on specifically-defined target parameters defined in advance of collecting data for analysis. By requiring pre-configured settings in this way, these systems cannot flexibly adapt to situations where certain data is unavailable or where a user desires to generate an analysis based on parameters not indicated in advance.

Thus, there are several disadvantages with regard to conventional digital campaign analysis systems.

SUMMARY

One or more embodiments described herein provide benefits and solve one or more of the foregoing or other problems in the art with systems, methods, and non-transitory computer readable media that generate and provide stacked attribution distributions within a stacked attribution interface utilizing various attribution models. In particular, the disclosed systems can evaluate raw analytics data on the fly, without pre-configuration, to provide up-to-date stacked attribution breakdowns utilizing a variety of attribution models. Specifically, the disclosed systems can modify the results of one attribution model utilizing another attribution model such that the models can be combined to produce additional breakdown insights. For example, the disclosed systems can provide a stacked attribution interface to present attribution distribution breakdowns at multiple levels where, for example, a first attribution distribution represents events attributed to various dimension values at a first level and a stacked attribution distribution represents events attributed to various sub-values of a given dimension value at a second, deeper level.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
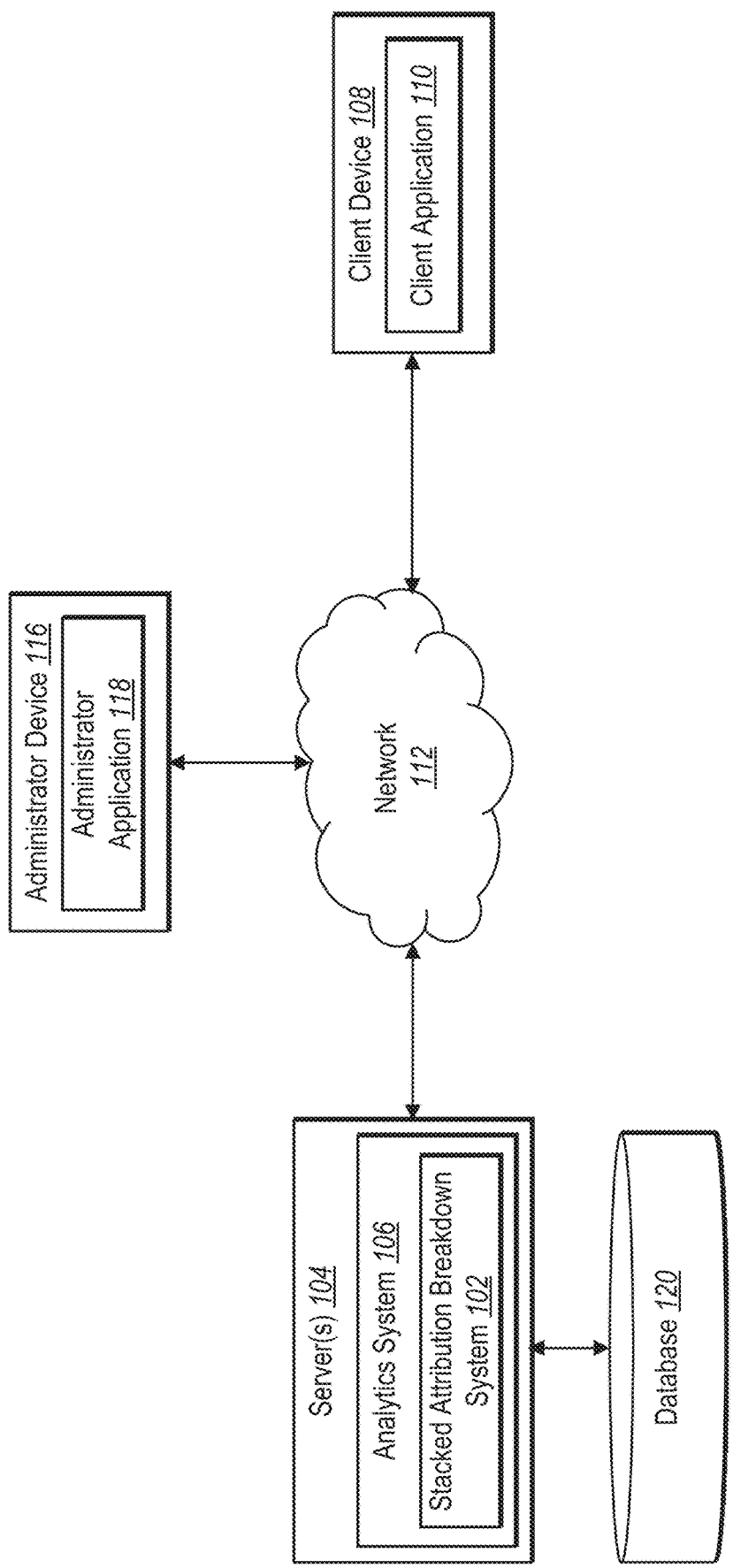
FIG. 1 illustrates an example environment for implementing a stacked attribution breakdown system in accordance with one or more embodiments.

One or more embodiments described herein provide benefits and solve one or more of the foregoing or other problems in the art with a stacked attribution breakdown system that can generate and provide stacked attribution distributions within a stacked attribution interface utilizing various attribution models. For example, the stacked attribution breakdown system can receive user input of an event category and a dimension for a given digital content campaign. Based on collected campaign data, the stacked attribution breakdown system can utilize an attribution model to generate an initial attribution distribution of the events across values of the selected dimension. Additionally, the stacked attribution breakdown system can apply an additional attribution model to one of the dimension values of the initial attribution distribution. Indeed, the stacked attribution breakdown system can generate a stacked attribution distribution by applying an additional attribution model to determine an attribution of events across sub-values of the indicated dimension value. In this manner, the stacked attribution breakdown system can generate a stacked attribution user interface that improves accuracy, efficiency, and flexibility of implementing computing devices in managing granular attribution details of one or more digital content campaigns.

As mentioned above, the stacked attribution breakdown system can provide a user interface with various selectable elements. For example, to generate a stacked attribution distribution, the stacked attribution breakdown system can provide a user interface with selectable dimension elements, selectable event category elements, and selectable attribution model elements. To illustrate, based on user interaction with the selectable dimension elements, event category elements, and attribution model elements, the stacked attribution breakdown system can identify distribution channels as the dimension to analyze in a digital content campaign, purchases as the event category to analyze in the digital content campaign, and first touch as the pertinent attribution model. Based on the user input, the stacked attribution breakdown system can generate, for display, an attribution distribution reflecting first touch attribution of purchases across the various distribution channels of the relevant campaign such as email, paid search, and social networks. Thus, the stacked attribution breakdown system can generate an attribution distribution that illustrates which portions of the total purchases (e.g., which events in an event category) are attributable to each of the distribution channels (e.g., are attributable to each dimension value in the digital content campaign dimension) based on a pertinent attribution model.

In addition, the stacked attribution breakdown system can generate a stacked attribution distribution that breaks down the results of the overall attribution distribution across sub-values within the selected dimension. To illustrate, a user can select a specific dimension value from the previously selected dimension (e.g., select email from a plurality of distribution channels). Moreover, a user can select a second dimension to analyze (e.g., products within the specific distribution channel), and an additional attribution model to apply (e.g., a last touch attribution model). The stacked attribution breakdown system can then generate a stacked attribution distribution for the second dimension based on the additional attribution model.

Specifically, the stacked attribution breakdown system can identify a subset of events corresponding to the selected dimension value (e.g., the subset of purchases corresponding to the email distribution channel). In addition, the stacked attribution breakdown system can apply the additional attribution model to the subset of events. In this manner, the stacked attribution breakdown system can generate a stacked attribution distribution of the subset of events across the second dimension (e.g., a second attribution distribution of the subset of purchases corresponding to the email distribution channel across different products based on a last touch attribution model). Thus, the stacked attribution breakdown system can provide a user interface with a general attribution distribution based on a first attribution for a first dimension and generate a more granular attribution distribution for a second dimension (within the first dimension) based on second attribution model.

In this manner, the stacked attribution breakdown system can generate stacked attribution distributions at multiple levels. Indeed, the stacked attribution breakdown system can generate multi-layered breakdowns where a first overall attribution distribution depicts details of events attributed across a first dimension, a first stacked attribution distribution depicts details of the events attributed across a second dimension within the first dimension (e.g., within a given dimension value of the first dimension), a second stacked attribution depicts details of the events attributed across a third dimension within the second dimension, and so forth.

The stacked attribution breakdown system provides several advantages over conventional systems. For example, the stacked attribution breakdown system can improve accuracy of computing systems for managing digital content campaigns. To illustrate, the stacked attribution breakdown system can generate stacked attribution distributions as multi-layered breakdowns utilizing different attribution models (e.g., stacked attribution distributions based on other attribution distributions), thereby identifying more granular, accurate attribution insights for managing digital content campaigns. For example, the stacked attribution system can determine an accurate first touch attribution of clicks resulting from a particular product from an overall subset of clicks attributable to a particular distribution channel based on last touch attribution. Thus, the stacked attribution breakdown system generates more granular attribution distributions to more accurately determine event attributions for digital content campaigns.

The stacked attribution breakdown system also improves flexibility over conventional systems. For example, the stacked attribution breakdown system can flexibly generate attribution distributions for a variety of different dimensions event categories, and attribution models in real time. Indeed, unlike conventional systems that are limited to a set of pre-configured reports, the stacked attribution breakdown system can generate attribution distributions on the fly utilizing query-time attribution in accordance with user input. For example, the stacked attribution breakdown system can generate a first attribution distribution based on a first attribution model and can generate a stacked attribution distribution within the first attribution distribution based on a second attribution model. Additionally, unlike conventional system, the stacked attribution breakdown system can receive user input to modify attribution distributions by changing attribution models, dimensions, and/or event categories of a given distribution.

Furthermore, the stacked attribution breakdown system improves efficiency relative to conventional systems. To elaborate, the stacked attribution breakdown system increases the efficiency of computer devices by increasing the ease and efficiency of accessing particular data and functionality. To elaborate, the stacked attribution breakdown system generates and provides, for display, a stacked attribution user interface that presents stacked attribution distributions together with (e.g., as a nested breakdown of) first-layer attribution distributions. In addition, the stacked attribution user interface can include various elements such as attribution model elements, dimension elements, and event category elements that enable a user to quickly and efficiently generate multiple levels of attribution distributions without needing to collect additional campaign data or navigate to additional interfaces to access multiple reports or attribution distributions. Thus, the stacked attribution breakdown system reduces a number of user interactions required to generate multiple attribution distributions and to analyze the data of the distributions in their respective contexts.

As illustrated by the foregoing discussion, the present disclosure utilizes a variety of terms to describe features and benefits of the stacked attribution breakdown system. Additional detail is hereafter provided regarding the meaning of these terms as used in this disclosure. For example, the term "attribution" refers to a measure of causation, credit, contribution, responsibility, or influence (in whole or in part) between a factor or variable and a result. In particular, attribution can include an assignment of credit or influence to a dimension value for an event. For instance, attribution can refer to determining that digital content distributed through email are responsible for a particular percentage of overall purchases of a given product (i.e., the dimension value of email is wholly or partially responsible for particular purchase events).

Similarly, the term "attribution model" as used herein refers to a computer-based algorithm or rule set that determines an attribution or attribution distribution. In particular, an attribution model includes a computer-implemented algorithm that determines a measure of causation, credit, contribution, influence, or responsibility between a factor (e.g., a dimension value) and a result (e.g., an event), where multiple factors may contribute to the result. In some embodiments, an attribution model employs machine learning or statistical models to determine weights (e.g., using a regression analysis). In other embodiments an attribution model is rule-based by using predetermined weights based on rules. The stacked attribution breakdown system can train an attribution model based on observations that incorporate a discrete-time survival model, which is a type of time-to-event model. In addition, the stacked attribution breakdown system can create a supervised learning model (e.g., via machine learning).

Attribution models include, for example, a first touch model, a last touch model, a linear model, a participation model, a same touch model, a U-shaped model, J curve model, an inverse J model, a time decay model, and a custom model. A first touch attribution model assigns all the credit of success to a first channel (or other dimension value) with which a user engages. A last touch model assigns all credit to the last channel (or other dimension value) with which a user engages. A linear model applies equal weight to all dimension values (e.g., distribution channels). A participation model assigns equal credit to every unique dimension value. A same touch model assigns all credit to the dimension value where a result (e.g., conversion) occurs. A U-shaped model assigns particular percentages of credit to dimension values of two key touchpoints—the first touch and the lead creation—as well as those values of any touchpoints in between the two. A J curve model assigns particular percentages of credit to the values of the first and last touchpoints (e.g., 20% to the first and 60% to the last) and spreads the remaining percentage across any dimension values of additional touchpoints. An inverse J model is the inverse of the J curve model where, for example, 60% of the credit is assigned to the dimension value of the first touchpoint and 20% is assigned to the last. A time decay model assigns credit according to the length of time between touchpoints or between a touchpoint and a result (e.g., a conversion), where dimension values of more recent touchpoints are weighted heavier than those of older touchpoints which may not have been as impactful on a given result. A custom model attributes credit according to user-defined parameters or settings. Indeed, the stacked attribution breakdown system can receive user input within the stacked attribution user interface to define a custom attribution model.

Relatedly, an "event" refers to a quantifiable action performed by a user or a quantifiable result of an action by a user. In some cases, an event includes a discrete quantifiable action (or result of an action) taken by a visitor on a network platform, such as in a software application or a on website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

As noted above, the stacked attribution breakdown system can categorize events into event categories. As used herein, an "event category" refers to a collective class or type of quantifiable actions (or quantifiable result of actions) by users. In particular, in some embodiments, an event category includes a type of quantifiable actions (or result of actions) taken by a visitor on a network platform. Event categories include, but are not limited to, application downloads, application uses, clicks, click-throughs, conversions, orders, purchases, revenue, searches, time spent on a given webpage, views, visits, or first time visits. In some embodiments, each time a user interacts with a particular entity (e.g., dimension value such as a distribution channel), the stacked attribution breakdown system stores the event within an analytics database.

As mentioned, the stacked attribution breakdown system identifies, tracks and stores events relative to particular dimensions and dimension values. As used in this disclosure, a "dimension" refers to a set, category, or classification of values for organizing or attributing underlying data (e.g., a set of values for analyzing, grouping, or comparing event data). In some embodiments, a dimension refers to non-numeric characteristics (e.g., characteristics of one or more digital content campaigns) that correlate, relate, or classify events. Dimensions include, but are not limited to, distribution channels, products, product names, webpages, campaigns, ages, custom eVars, dates, monitor resolutions, genders, geographic locations, pages, or page names. Relatedly, a "dimension value" refers to a particular item, value, or component in a dimension. For example, a dimension value can be a particular distribution channel, product, product name, webpage, campaign, age, custom eVar, date, monitor resolution, gender, geographic location, monitor resolution, product, product name, page, or page name.

As a particular example of a dimension, a "distribution channel" can refer to a medium, channel, outlet, or method by which a user can access or receive information. For example, a distribution channel can include a medium by which a user purchases a product or observes a video related to a service. Distribution channels include, but are not necessarily limited to, email, referring domains, display, social media, organic search, paid search.

As mentioned, the stacked attribution breakdown system generates attribution distributions to assign credit for events across dimension values of a dimension. As used herein, an "attribution distribution" refers to a distribution or allocation of events across values of a dimension in accordance with an attribution model. For example, an attribution distribution can include an indication that 40% of purchases of a particular product is attributed to email distributions while 50% is attributed to paid searches and 10% is attributed to social networking. In addition, a "stacked attribution distribution" refers to an attribution distribution that is stacked or nested within another attribution distribution. For example, a stacked attribution distribution can indicate allocations of events across sub-values of a given dimension value as a breakdown of the given dimension value. Thus, the stacked attribution breakdown system can determine attributions of events across dimension values as well as sub-values. The stacked attribution breakdown system can continue to generate stacked attribution distributions as breakdowns of sub-values in as many layers as a user desires.

As mentioned, the stacked attribution breakdown system can receive user input within a stacked attribution user interface to generate attribution distributions. In particular, the stacked attribution breakdown system can receive interactions relative to various elements within the stacked attribution user interface. As used herein, an "element" refers to a user interface element that is interactive and selectable by a user. In particular, user interface elements can include attribution model elements selectable to indicate particular attribution models, event category elements selectable to indicate particular event categories, and dimension elements selectable to indicate dimensions.

Additional detail regarding the stacked attribution breakdown system will now be provided with reference to the figures. For example, FIG. 1 illustrates a schematic diagram of an example environment for implementing a stacked attribution breakdown system 102 in accordance with one or more embodiments. An overview of the stacked attribution breakdown system 102 is described in relation to FIG. 1. Thereafter, a more detailed description of the components and processes of the stacked attribution breakdown system 102 is provided in relation to the subsequent figures.

As shown in FIG. 1, the environment includes server(s) 104, a client device 108, a network 112, an administrator device 116, and a database 120. Each of the components of the environment can communicate via the network 112, and the network 112 may be any suitable network over which computing devices can communicate. Example networks are discussed in more detail below in relation to FIG. 14.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 14. Although FIG. 1 illustrates a single client device 108, in some embodiments the environment can include multiple different user client devices, each associated with a different user. The client device 108 can communicate with one or more of the administrator device 116 and/or the server(s) 104. For example, the client device 108 can receive user input and other activity information and provide the information pertaining to user activity including touchpoints or other user actions to the administrator device 116 and/or server(s) 104. Thus, the stacked attribution breakdown system 102 on the server(s) 104 can collect information on user activity to use in determining relationships of user activity to events and/or dimension values. In addition, the client device 108 can receive information from the administrator device 116 and/or the server(s) 104 in the form of generated digital content as part of a digital content campaign.

As shown, the client device 108 includes a client application 110. In particular the client application may be a web application or a native application installed on the client device 108 (e.g., a mobile application, a desktop application, etc.). The client application 110 can present or display various information to a user, including digital content (e.g., images, videos, audio, and/or text) distributed as part of a digital content campaign. A user can interact with the client application 110 to provide user input in relation to digital content. For example, the client application 110 can receive clicks, views, page-throughs, scrolls, search queries, keystrokes, or other user activity and can provide information pertaining to the user activity to the server(s) 104 and/or administrator device 116.

As also mentioned, the environment includes an administrator device 116 (e.g., to assist in managing digital content campaigns on behalf of an administrator). Like the client device 108, the administrator device 116 can be any of a variety of computing devices including a smartphone, tablet, smart television, desktop computer, laptop computer, virtual reality device, augmented reality device, or other computing device. The administrator device 116 can be capable of accessing and/or generating a stacked attribution user interface including attribution distributions. In some embodiments, the administrator device 116 accesses or receives information from the server(s) 104 (e.g., via the network 112) indicating selected elements within a stacked attribution user interface. Indeed, in response to receiving a user selection of an element within a stacked attribution user interface, the administrator device 116 can provide selection information to the server(s) 104, whereupon the server(s) 104 can perform certain actions (e.g., apply a selected attribution model or generate an attribution distribution across a selected dimension according to a selected event category). Further, the client device 108 can facilitate operation of the client application 110.

As shown, the administrator device 116 of FIG. 1 includes an administrator application 118. The administrator application 118 may be a web application or a native application installed on the administrator device 116 (e.g., a mobile application, a desktop application, etc.). The administrator application 118 can present for display, via the administrator device 116, a stacked attribution user interface including various elements selectable by a user to generate attribution distributions. The administrator application 118 can also receive user input such as a selection of an attribution model element, an event category element, and/or a selection of a dimension element. In some embodiments, the administrator application 118 can interface with the stacked attribution breakdown system 102 to provide and/or receive attribution distributions from the server(s) 104, and to present (e.g., display) the attribution distributions received from the server(s) 104.

As illustrated in FIG. 1, the environment includes the server(s) 104. The server(s) 104 may generate, store, receive, and transmit electronic data, such as attribution distributions and the parameters necessary for generating attribution distributions (e.g., attribution models, dimensions, and event categories). For example, the server(s) 104 may receive data from the client device 108 in the form of a user selection of an element. In addition, the server(s) 104 can transmit data to the administrator device 116 to provide an attribution distribution based on the selected element. Additionally still, the server(s) can transmit data to the client device 108 to provide digital content as part of a digital content campaign generated (or modified) based on one or more attribution distributions. For instance, the administrator device 116 can generate or modify a digital content campaign by selecting distribution channels (or other dimension values) with high attribution (as determined based on stacked attribution breakdowns via the stacked attribution user interface). Moreover, the server(s) 104 can provide digital content to the client device 108 in accordance with selected parameters of the digital content campaign generated via the administrator device 116. For example, the server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content campaign server.

As shown in FIG. 1, the server(s) 104 can also include the stacked attribution breakdown system 102 as part of an analytics system 106. The analytics system 106 can communicate with the client device 108 to receive information such as indications of dimensions, events, and attribution models and can process the information to access stored analytic data pertaining to events, dimensions, and attribution models. Indeed, the analytics system 106 can refer to a digital content campaign system and/or a system for facilitating manipulation or analysis of various gathered data pertaining to one or multiple campaigns.

As also shown in FIG. 1, the environment includes a database 120. In particular, the stacked attribution breakdown system 102 located on the server(s) 104 can communicate with the database 120 to store and/or access information. To illustrate, the stacked attribution breakdown system 102 can gather user activity information from the client device 108 (and other client devices) relating to touchpoints and events. The stacked attribution breakdown system 102 can further store the information in the database 120. Thus, in generating attribution distributions and/or stacked attribution distributions, the stacked attribution breakdown system 102 can access the information stored within the database 120 upon receiving a request for the information from the administrator device 116. Indeed, the stacked attribution breakdown system 102 can access the information in the database 120 in real time (or near real time) without requiring pre-configuration or any form of advanced notice. For example, the stacked attribution breakdown system 102 can receive a request to generate an attribution distribution of events across particular dimension values and can query the database 120 for the required information to generate the attribution distribution on the fly.

Although FIG. 1 depicts the stacked attribution breakdown system 102 located on the server(s) 104, in some embodiments, the stacked attribution breakdown system 102 may be implemented by (e.g., located entirely or in part) on one or more other components of the environment. For example, the stacked attribution breakdown system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the stacked attribution breakdown system 102, bypassing the network 112. Additionally, the stacked attribution breakdown system 102 can include one or more databases (e.g., an analytics database) housed on the server(s) 104 or elsewhere in the environment. The stacked attribution breakdown system 102 can be implemented in a variety of different ways across the server(s) 104, the network 112, and the client device 108.

Figure 2:
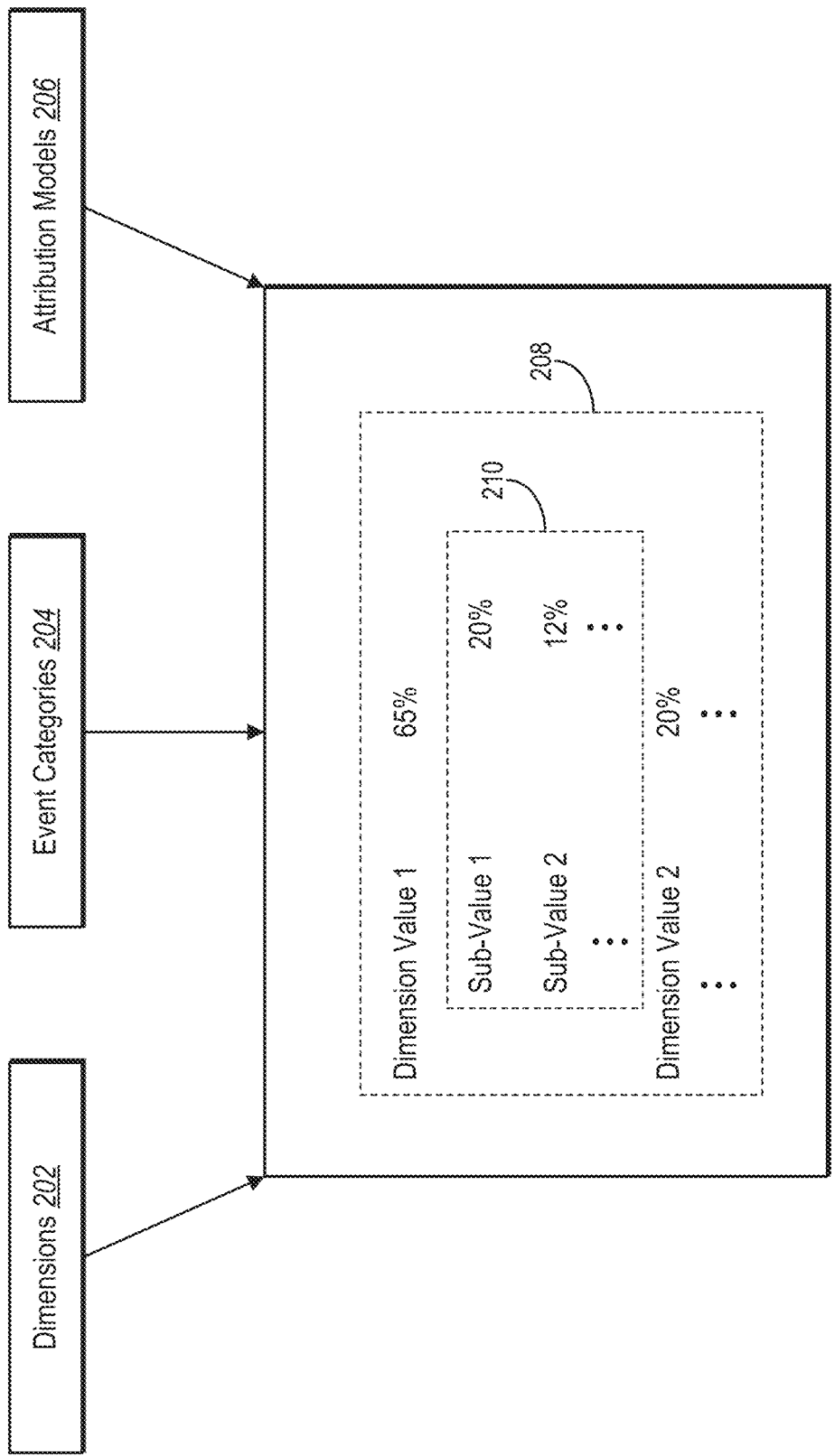
FIG. 2 illustrates an example overview of generating and providing stacked attribution distributions within a stacked attribution user interface in accordance with one or more embodiments.

As mentioned above, the stacked attribution breakdown system 102 can generate stacked attribution distributions as breakdowns of overall attribution distributions. FIG. 2 illustrates the stacked attribution breakdown system 102 generating an example stacked attribution user interfaces in accordance with one or more embodiments.

As discussed above, the stacked attribution breakdown system 102 can manage a repository or database (e.g., the database 120) of analytics data that includes a plurality of events detected from various client devices. Moreover, the stacked attribution breakdown system 102 can monitor and record various dimensions of the events. For example, the stacked attribution breakdown system 102 can monitor the digital content provided to client devices, distribution channels, products, or any other dimension corresponding to the particular events. Furthermore, the stacked attribution breakdown system 102 can store and apply various attribution models for determining attribution of particular events across dimensions. The stacked attribution breakdown system 102 can then provide selectable elements corresponding to the dimensions, event categories, and attribution models from the database to generate real-time, dynamic stacked attribution distributions using a variety of attribution models.

For example, as illustrated in FIG. 2, the stacked attribution breakdown system 102 can provide one or more dimensions 202, event categories 204, and/or attribution models 206 for display via a user interface of a client device 212. The stacked attribution breakdown system 102 further identifies a dimension by receiving or detecting a user interaction with a dimension element within a stacked attribution user interface. Similarly, the stacked attribution breakdown system 102 identifies an event category by receiving a user interaction with an event category element.

Based on identifying the dimension and the event category, the stacked attribution breakdown system 102 generates a first attribution distribution 208. Specifically, the stacked attribution breakdown system 102 determine the first attribution distribution 208 of events across a particular dimension that includes multiple values (e.g., Dimension Value 1, Dimension Value 2, and so on). Indeed, the stacked attribution breakdown system 102 determines an attribution for each dimension value to indicate a number and/or percentage of events defined by the event category that are credited or allocated to each dimension value. As illustrated, the stacked attribution breakdown system 102 determines that 65% of the events are attributed to Dimension Value 1 and 20% of the events are attributed Dimension Value 2. As indicated by the ellipsis, the stacked attribution breakdown system 102 also determines attributions associated with additional dimension values, though in some embodiments the stacked attribution breakdown system 102 provides only a portion of the total number of attributions for display.

To determine the attribution distribution shown within the attribution distribution 208, the stacked attribution breakdown system 102 implements an attribution model. In particular, the stacked attribution breakdown system 102 applies a user-selected or system-selected model to allocate particular events to particular dimension values. For instance, the stacked attribution breakdown system 102 can receive a user input to apply a first touch attribution model and can determine which distribution channels (i.e., dimension values) are responsible for how many purchases (i.e., events).

As further illustrated in FIG. 2, the stacked attribution breakdown system 102 generates and provides a stacked attribution distribution 210 (e.g., a further breakdown of the first attribution 208). As shown, the stacked attribution breakdown system 102 generates the stacked attribution distribution 210 with respect to events attributed to Dimension Value 1. Indeed, the stacked attribution breakdown system 102 applies an additional attribution model to the events attributed to Dimension Value 1 to generate a stacked attribution distribution 210 across a second dimension with a plurality of additional dimensional values (e.g. Sub-Value 1, Sub-Value 2, etc.). Thus, as shown, the stacked attribution breakdown system 102 provides the stacked attribution distribution 210 depicting that 20% of the events within Dimension Value 1 are attributed to Sub-Value 1, 12% are attributed to Sub-Value 2, and so forth.

To generate the stacked attribution 210, the stacked attribution breakdown system 102 identifies the second dimension from the dimensions 202, an additional attribution model from the attribution models 206. For example, the stacked attribution breakdown system 102 receives a user selection of a dimension element corresponding to a second dimension and a user selection of an attribution model element corresponding to a second attribution model. The stacked attribution breakdown system 102 can also identify the Dimension Value 1 (i.e., the dimension value to break down) based on user selection of the Dimension Value 1. Thus, the stacked attribution breakdown system 102 determines a second dimension to apply to the subset of events attributable to Dimension Value 1 to break the subset of events attributable to Dimension Value 1 down into an additional attribution distribution for sub-values of the second dimension.

Although not illustrated in FIG. 2, the stacked attribution breakdown system 102 can generate further stacked attribution distributions. For example, the stacked attribution breakdown system 102 can generate multiple stacked attribution distributions at a single level where a first stacked attribution distribution breaks down a first dimension value into a first set of sub-values and a second stacked attribution distribution breaks down a second dimension value (within the same dimension as the first dimension value) into a second set of sub-values. Additionally or alternatively, the stacked attribution breakdown system 102 can generate stacked attributions within other stacked attributions. Indeed, the stacked attribution breakdown system 102 can generate breakdowns within the sub-values shown in FIG. 2. Taking this progression further, the stacked attribution breakdown system 102 can thus generate breakdowns at a variety of levels to determine attributions with respect to dimension values nested within other dimension values to a variety of different desired depths.

Figure 3:
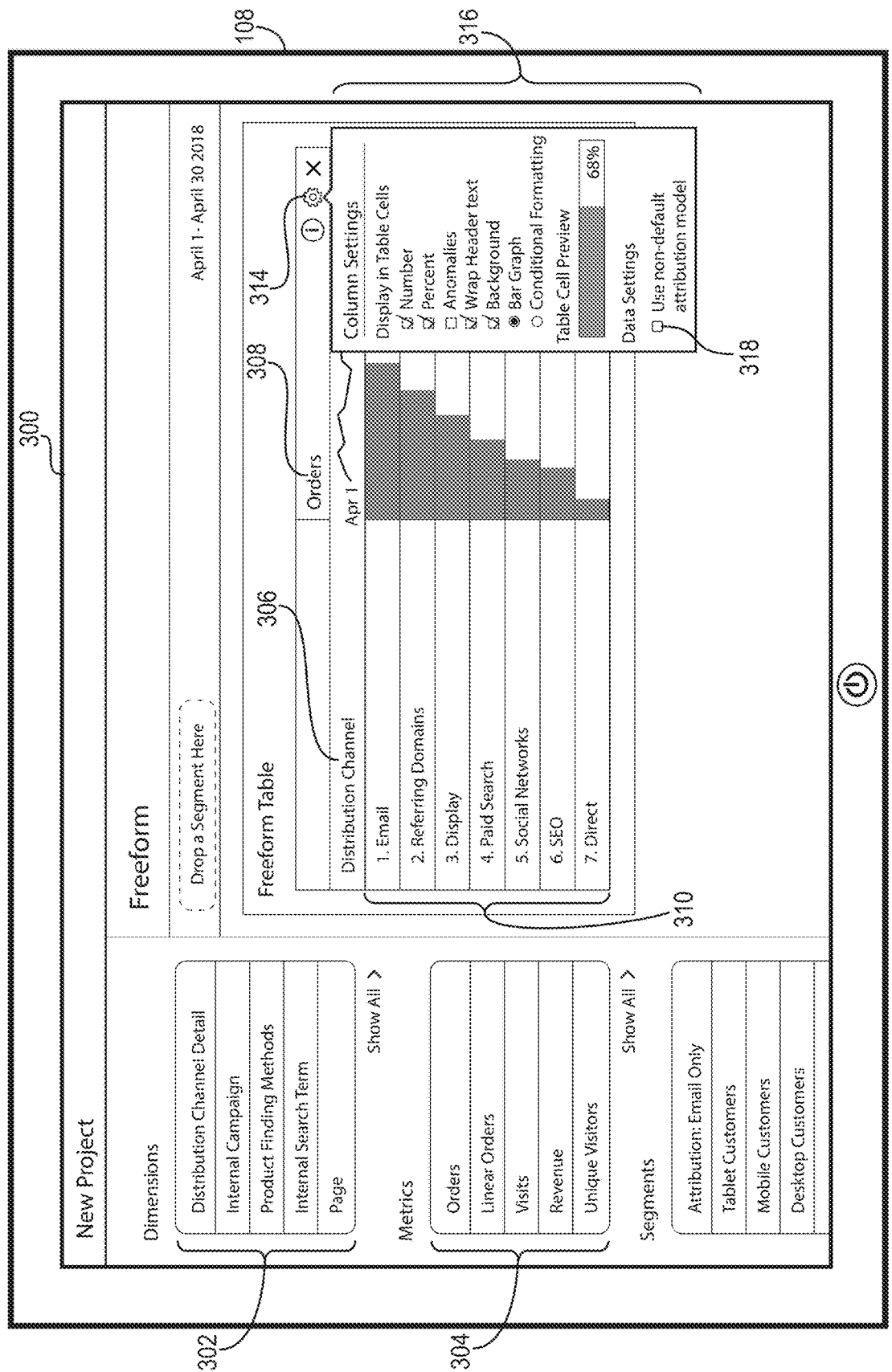
FIG. 3 illustrates an example stacked attribution user interface including an attribution distribution together with various selectable elements in accordance with one or more embodiments.

As mentioned, the stacked attribution breakdown system 102 can generate a stacked attribution user interface for displaying stacked attribution breakdowns. FIG. 3 illustrates a stacked attribution user interface 300 within a display of a client device 108 in accordance with one or more embodiments. As mentioned, the stacked attribution breakdown system 102 generates attribution distributions based on identifying an attribution model, an event category, and/or a dimension. For instance, the stacked attribution breakdown system 102 receives user interaction with elements within the stacked attribution user interface 300 to determine which attribution model, event category, and/or dimension to implement in generating an attribution distribution. As illustrated, the stacked attribution user interface 300 includes various elements such as dimension elements 302 and event category elements 304.

Based on receiving a user interaction with a dimension element 302, the stacked attribution breakdown system 102 determines and provides, for display, a dimension 306 for the stacked attribution user interface 300. In addition, the stacked attribution breakdown system 102 identifies dimension values 310 corresponding to the dimension 306 and provides the dimension values 310 for display within the stacked attribution user interface 300. As shown, the stacked attribution breakdown system 102 identifies the dimension 306 as distribution channels where the dimension values 310 are the individual channels such as email, referring domains, display, paid search, social networks, search engine optimization, and direct contact.

Based on receiving a user interaction with an event category element 304, the stacked attribution breakdown system 102 determines an event category 308. In addition, the stacked attribution breakdown system 102 provides the event category 308 for display within the stacked attribution user interface 300 shown in FIG. 3. The event category 308 indicates the events that the stacked attribution breakdown system 102 will collect and attribute to the various dimension values 310 within the dimension 306. As illustrated, the stacked attribution breakdown system 102 generates an attribution distribution of different "Orders" across the various distribution channels of the dimension 306.

To elaborate, the stacked attribution breakdown system 102 determines, for each dimension value 310, a subset of events within the event category 308 that are attributed (e.g., credit or allocated) to the dimension value 310. Thus, the stacked attribution breakdown system 102 determines a first subset of events for a first dimension value, a second subset of events for a second dimension value, and so forth. For example, the stacked attribution breakdown system 102 determines that 700 orders are attributed to email, 234 orders are attributed to paid search, 239 orders are attributed to display, and so on. In some embodiments, depending on the attribution model applied to the attribute events across dimension values, the stacked attribution breakdown system 102 attributes certain percentages of a single event across multiple dimension values. To illustrate, in the case of applying a J curve attribution model to the orders event category, the stacked attribution breakdown system 102 can attribute, for each of the total number of orders, a first percentage of an order to email, a second percentage of an order to paid search, a third percentage of an order to display, and so forth. Additionally, the stacked attribution breakdown system 102 generates and provides, for display, a representation of the subset of events as a graphical bar, a number, and/or a percentage.

As shown, the stacked attribution breakdown system 102 generates the stacked attribution user interface 300 and presents the dimension values 310 in a ranked order, with the value corresponding to the highest number of attributed events presented first. Additionally, while the stacked attribution breakdown system 102 determines attributions for each dimension value 310 within the dimension 306, in some embodiments the stacked attribution breakdown system 102 provides only a particular number (e.g., 7 or 10) of dimension values 310 for display within the stacked attribution user interface 300.

As illustrated in FIG. 3, the stacked attribution breakdown system 102 further provides a preferences element 314. Based on receiving user interaction with the preferences element 314, the stacked attribution breakdown system 102 provides, for display, a preferences menu 316. Within the preferences menu 316, the stacked attribution breakdown system 102 provides various elements whereby a user can select display preferences for the stacked attribution user interface 300. Among the elements presented within the preferences interface 316, the stacked attribution breakdown system 102 provides an attribution model preferences element 318. In response to detecting user interaction with the attribution model preferences element 318, the stacked attribution breakdown system 102 provides options whereby a user can modify an attribution model applied to generate or modify the attribution distribution of orders shown in FIG. 3.

Figure 4:
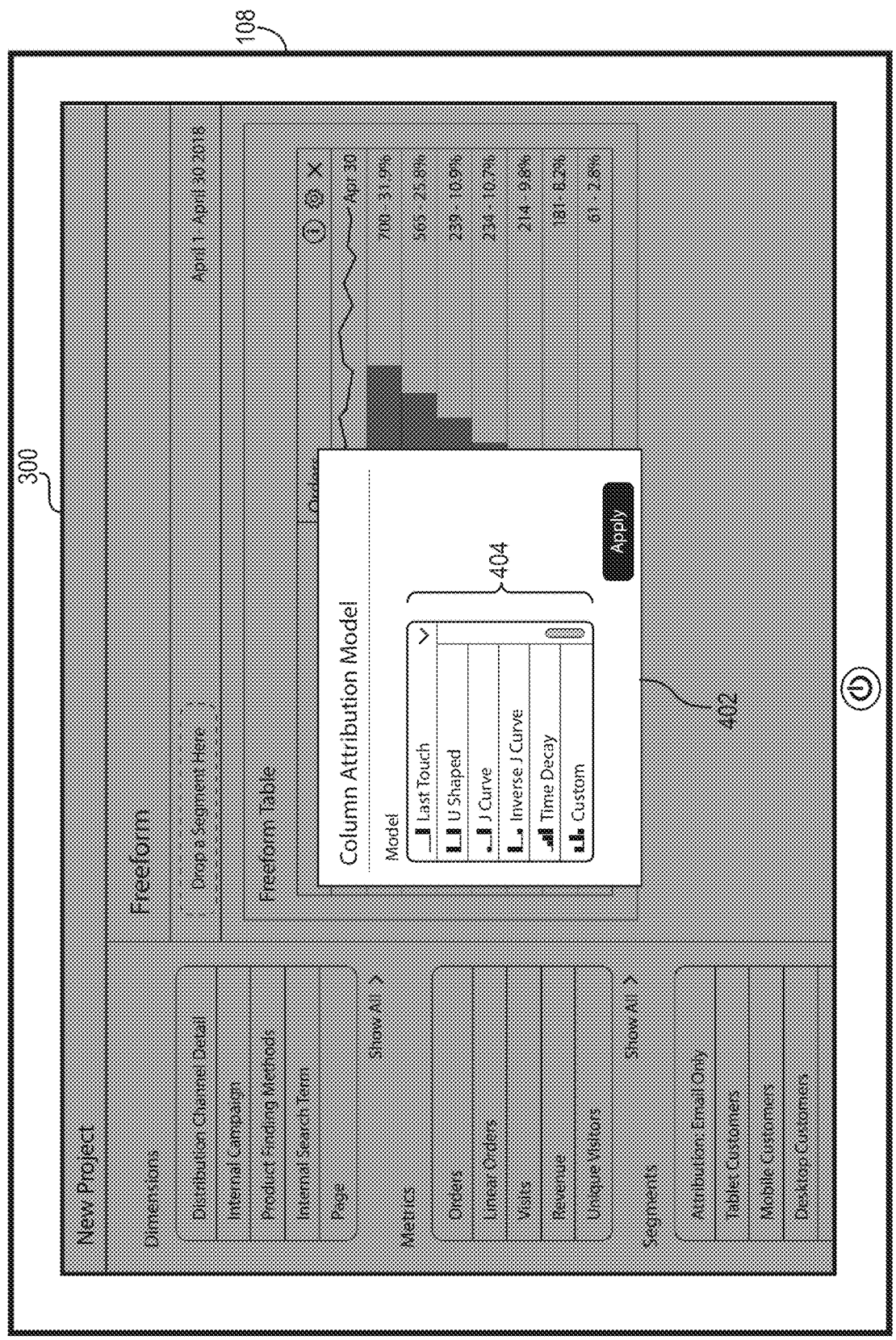
FIG. 4 illustrates an example stacked attribution user interface including attribution model elements in accordance with one or more embodiments.

Indeed, FIG. 4 illustrates the stacked attribution user interface 300 including an attribution model window 402 with attribution model elements 404. As shown, the stacked attribution breakdown system 102 provides the attribution model window 402 including the attribution model elements 404. Indeed, the stacked attribution breakdown system 102 receives a user selection of an attribution model element 404 to generate and/or modify an attribution distribution. For instance, the stacked attribution breakdown system 102 can receive a user input of a last touch model, a U-shaped model, a J curve model, an inverse J curve model, a time decay model, or a custom model. As also shown, the stacked attribution breakdown system 102 can receive a user input to apply a selected attribution model with respect to the event category and dimension of FIG. 3.

Figure 5:
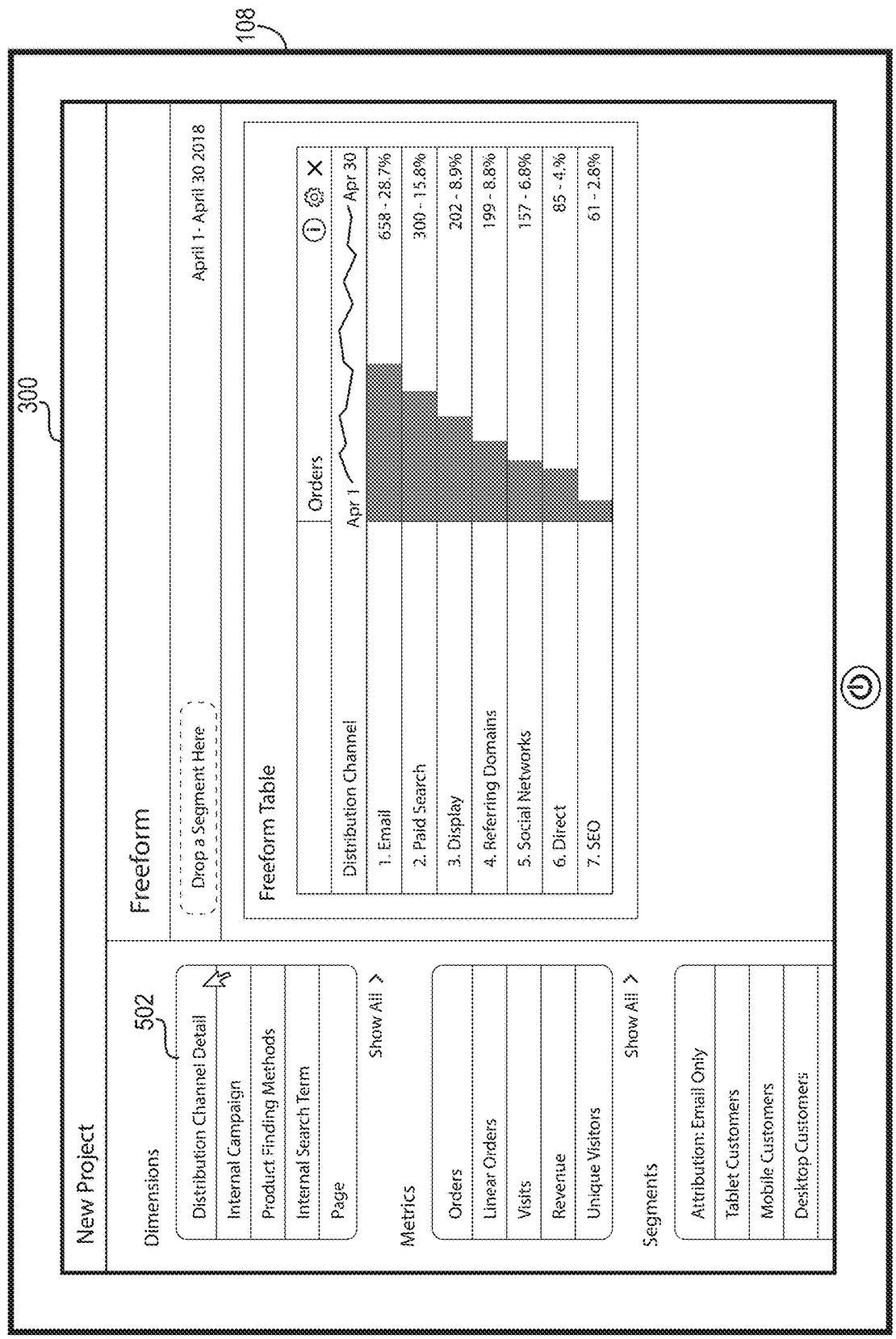
FIG. 5 illustrates an example stacked attribution user interface including an attribution distribution across dimension values in accordance with one or more embodiments.

Based on receiving a user interaction with an attribution model 404, the stacked attribution breakdown system 102 generates a modified attribution distribution. Indeed, FIG. 5 illustrates the stacked attribution user interface 300 including a modified attribution distribution. As shown, the stacked attribution breakdown system 102 determines different numbers of orders that correspond to the various distribution channels based on the selected attribution model. Thus, the distribution channels have different numbers and are in a different order within the stacked attribution user interface 300 as compared to FIG. 3.

To generate an attribution distribution, the stacked attribution breakdown system 102 analyzes information from a database and applies an attribution model to the information stored within the database. For example, the stacked attribution breakdown system 102 stores information including user actions/touchpoints, events, and dimension values. To illustrate, the stacked attribution breakdown system 102 applies an attribution model that corresponds to a selected attribution element to identify which user actions/touchpoints correspond to events within a particular event category. Indeed, the stacked attribution breakdown system 102 applies the model to user actions or touchpoints stored within an analytics database to determine which actions or touchpoints led to events within event categories.

To illustrate by way of an example, in the case of receiving user input to apply a J curve attribution model, the stacked attribution breakdown system 102 queries a database (e.g., the database 120) to access user action/touchpoint information as well as event information. Additionally, according to the J curve model, the stacked attribution breakdown system 102 attributes certain percentages of an event (e.g., an order) to the different user actions/touchpoints within the database. For instance, the stacked attribution breakdown system 102 attributes 20% of an order to an email interaction of the user (the first stored action associated with the user), 60% of the order to a paid search associated with the user (the last stored action associated with the user), and attributes the remaining 20% across all user actions/touchpoints that occurred between the email interaction and the paid search.

In addition, the stacked attribution breakdown system 102 can store dimension information within the database to determine dimension values that correspond to identified events. Thus, the stacked attribution breakdown system 102 can access stored information to determine which events are credited to which dimension values. For example, the stacked attribution breakdown system 102 can determine, based on information stored within the database, that an email was the first touchpoint by a user that ultimately ordered a product (i.e., an event). The stacked attribution breakdown system 102 can attribute the order of the product to the email under a first touch attribution model. The stacked attribution breakdown system 102 can likewise access the information stored within the database in a similar manner to modify attribution distributions in response to receiving a user interaction to select a new attribution model.

As illustrated in FIG. 5, the stacked attribution breakdown system 102 receives a user interaction with a dimension element 502. In particular, the stacked attribution breakdown system 102 receives a user interaction to select and/or click-and-drag the dimension element 502. Based on the user interaction (e.g., as the user interaction is held), the stacked attribution breakdown system 102 presents an animation of the dimension element 502 moving within the stacked attribution user interface 300. Indeed, FIG. 6 illustrates the stacked attribution user interface 300 including the dimension element 502 hovering over the dimension 306 as the user drags the element.

In some embodiments, though not illustrated, the stacked attribution breakdown system 102 provides attribution model elements 404 within the stacked attribution user interface 300 without first requiring user interaction with a preferences element 318. For example, looking again to FIG. 4, in some embodiments the stacked attribution breakdown system 102 provides the attribution model elements 404 within the left pane of the stacked attribution user interface 300 above or below the dimension elements 302 and/or event category elements 304.

Figure 6:
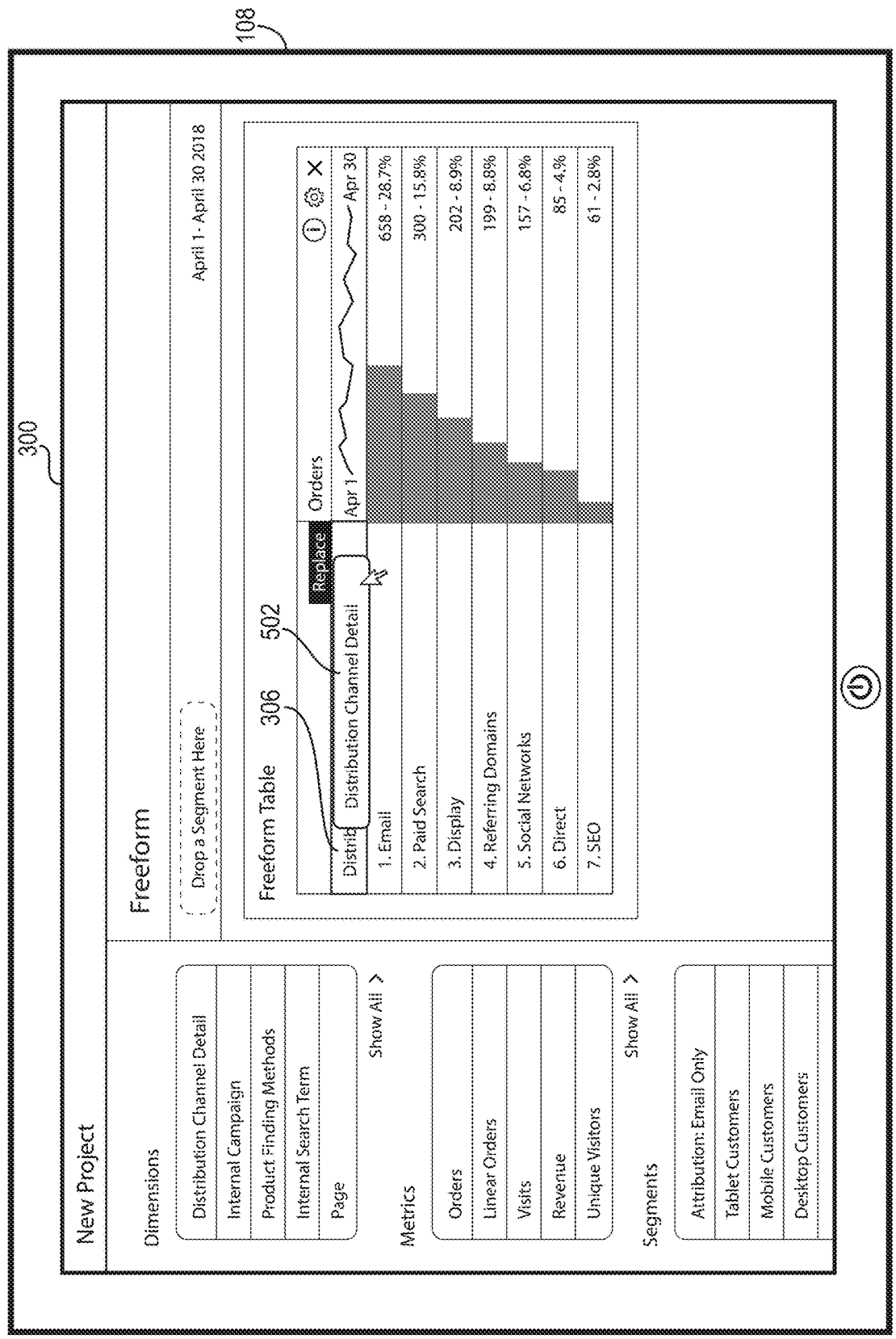
FIG. 6 illustrates an example stacked attribution user interface including a selection of a dimension element in accordance with one or more embodiments.

As shown in FIG. 6, the stacked attribution breakdown system 102 further receives user input indicating a selection to replace the dimension 306 with the dimension corresponding to the dimension element 502. For example, the stacked attribution breakdown system 102 detects a release of the user input to drop or deselect the dimension element 502 over the dimension 306. Alternatively, the stacked attribution breakdown system 102 receives a selection of the dimension 306 to indicate to replace the dimension 306. In response to the user input, the stacked attribution breakdown system 102 generates and provides a new attribution distribution across dimension values corresponding to the dimension indicated by dimension element 502.

Figure 7:
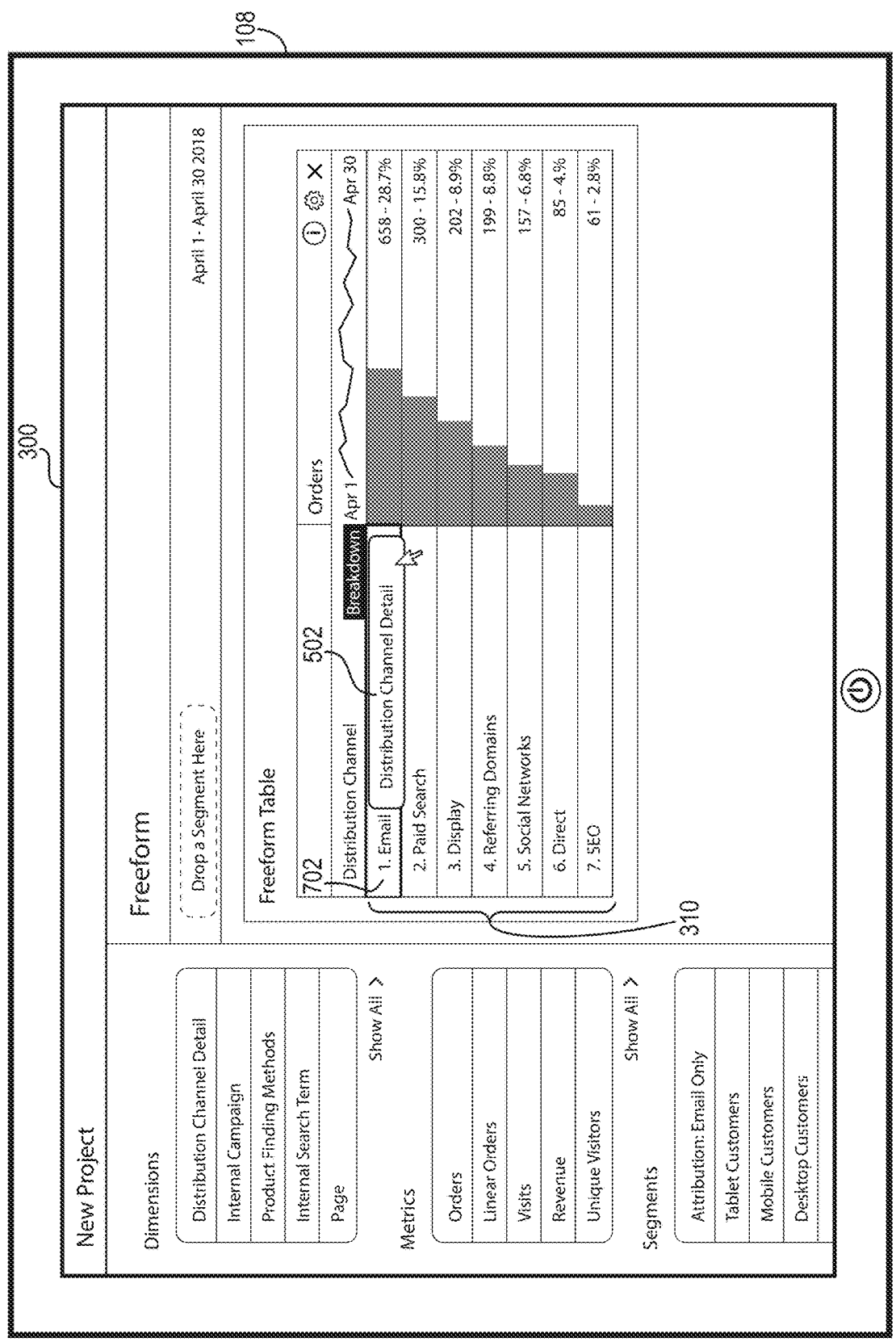
FIG. 7 illustrates an example stacked attribution user interface including a selection of a dimension element in accordance with one or more embodiments.

In some embodiments, the stacked attribution breakdown system 102 detects an indication to generate a breakdown of a dimension value rather than replace an overall dimension. For example, FIG. 7 illustrates the stacked attribution user interface 300 including the dimension element 702 hovering over a dimension value 702 within the dimension values 310. Upon detecting a user interaction, such as a release of the dimension element 502 over the dimension value 702, the stacked attribution breakdown system 102 generates a stacked attribution distribution of events associated with the dimension value 702. In particular, the stacked attribution breakdown system 102 generates a stacked attribution distribution across distribution channel details (i.e., specific emails) within the email distribution channel, as shown in FIG. 8.

Figure 8:
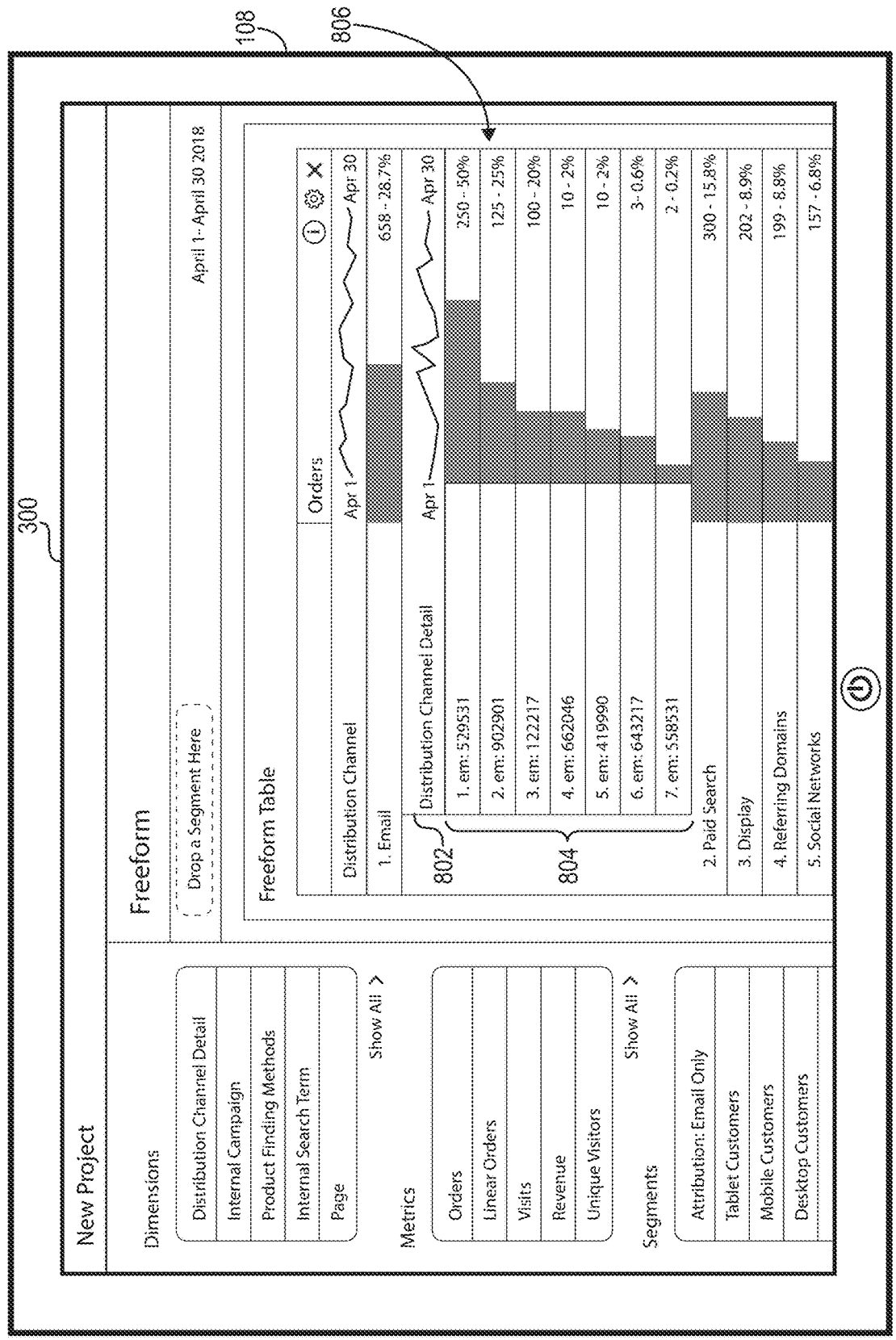
FIG. 8 illustrates an example stacked attribution user interface including a stacked attribution distribution in accordance with one or more embodiments.

Indeed, FIG. 8 illustrates the stacked attribution user interface 300 including a breakdown 806 that includes a stacked attribution distribution across dimension values 804 of a dimension 802. As illustrated, the dimension 802 corresponds to the dimension element 502 that the user dropped on the email distribution channel to generate the breakdown 806. Thus, as shown, the stacked attribution breakdown system 102 provides a more detailed look into the distribution channel details of the email distribution channel. Indeed, the stacked attribution distribution indicates attribution details corresponding to the subset of orders attributed to the email distribution channel based on application of the attribution model 404.

As illustrated, the stacked attribution breakdown system 102 generates the stacked attribution distribution for the breakdown 806 across the dimension values 804 (e.g., illustrated as sub-values for the email dimension value 702). To generate the stacked attribution distribution, the stacked attribution breakdown system 102 analyzes the subset of events attributed to the email distribution. Specifically, in relation to FIG. 8, the stacked attribution system identifies 658 orders attributed to the "Email" distribution channel utilizing the first attribution model. The stacked attribution breakdown system 102 then attributes this subset of orders across the specific emails illustrated in the dimension values 804.

In particular, the stacked attribution breakdown system 102 attributes the subset of orders utilizing a second attribution model (e.g., either the same or a different attribution model utilized to determine the 658 orders attributable to the "Email" dimension value). Specifically, the stacked attribution breakdown system 102 queries a database (e.g., the database 120) for information pertaining to user activity/touchpoints pertaining to the subset of events and dimension 802. For instance, the stacked attribution breakdown system 102 accesses various emails within the database that corresponding to the 658 orders attributed to the "Email" distribution channel. The stacked attribution breakdown system 102 then applies an attribution model (the same attribution model as applied to the dimension values 310 or a different attribution model) to attribute orders (or percentages of orders) across the emails (i.e., the dimension values 804). For example, the stacked attribution breakdown system 102 applies an inverse J curve model to attribute percentages of the subset of orders across the emails of the dimension 802. In this way, the stacked attribution breakdown system 102 determines an attribution distribution of a subsets of events pertaining to a broader email dimension value across individual emails pertaining to the dimension values 804.

Although the stacked attribution breakdown system 102 can generate a stacked attribution distribution across all dimension values of a particular dimension, in some embodiments the stacked attribution breakdown system 102 provides only a subset of dimension values for display. In these or other embodiments, the stacked attribution breakdown system 102 presents the dimension values in a ranked order, with the values corresponding to the highest numbers of events (e.g., orders) displayed higher in the list. As shown in FIG. 8, the stacked attribution user interface 300 includes the top seven dimension values 804 within the distribution channel detail dimension 802. In some embodiments, the stacked attribution breakdown system 102 presents more or fewer dimension values. In the same or other embodiments, the stacked attribution breakdown system 102 provides a scroll bar or other means by which a user can scroll through dimension values 804 to view more dimension values 804 within the dimension 802.

As illustrated, the stacked attribution breakdown system 102 generates and provides the stacked attribution user interface 300, which simultaneously displays multiple attribution distributions—the first attribution distribution across distribution channels and the stacked attribution distribution across distribution channel details. Thus, the stacked attribution breakdown system 102 provides an improvement in efficiency over any conventional systems that are incapable of generating and providing multiple attribution distributions simultaneously. For instance, as described above, the stacked attribution breakdown system 102 requires fewer user interactions to access information pertaining to the different distributions because they are presented together within the same stacked attribution user interface 300 (and therefore within relevant context), rather than in separate interfaces.

In addition, the stacked attribution breakdown system 102 receives user input to modify a stacked attribution distribution. For example, in some embodiments the stacked attribution breakdown system 102 receives a user interaction to replace the dimension 802 with a different dimension. Indeed, the stacked attribution breakdown system 102 receives a user interaction to select a dimension element within the stacked attribution user interface 300. In some embodiments, the stacked attribution breakdown system 102 enables a user to search for elements to select to apply to an attribution distribution. For instance, FIG. 9 illustrates the stacked attribution user interface 300 including a search bar 906 and search results 908.

Figure 9:
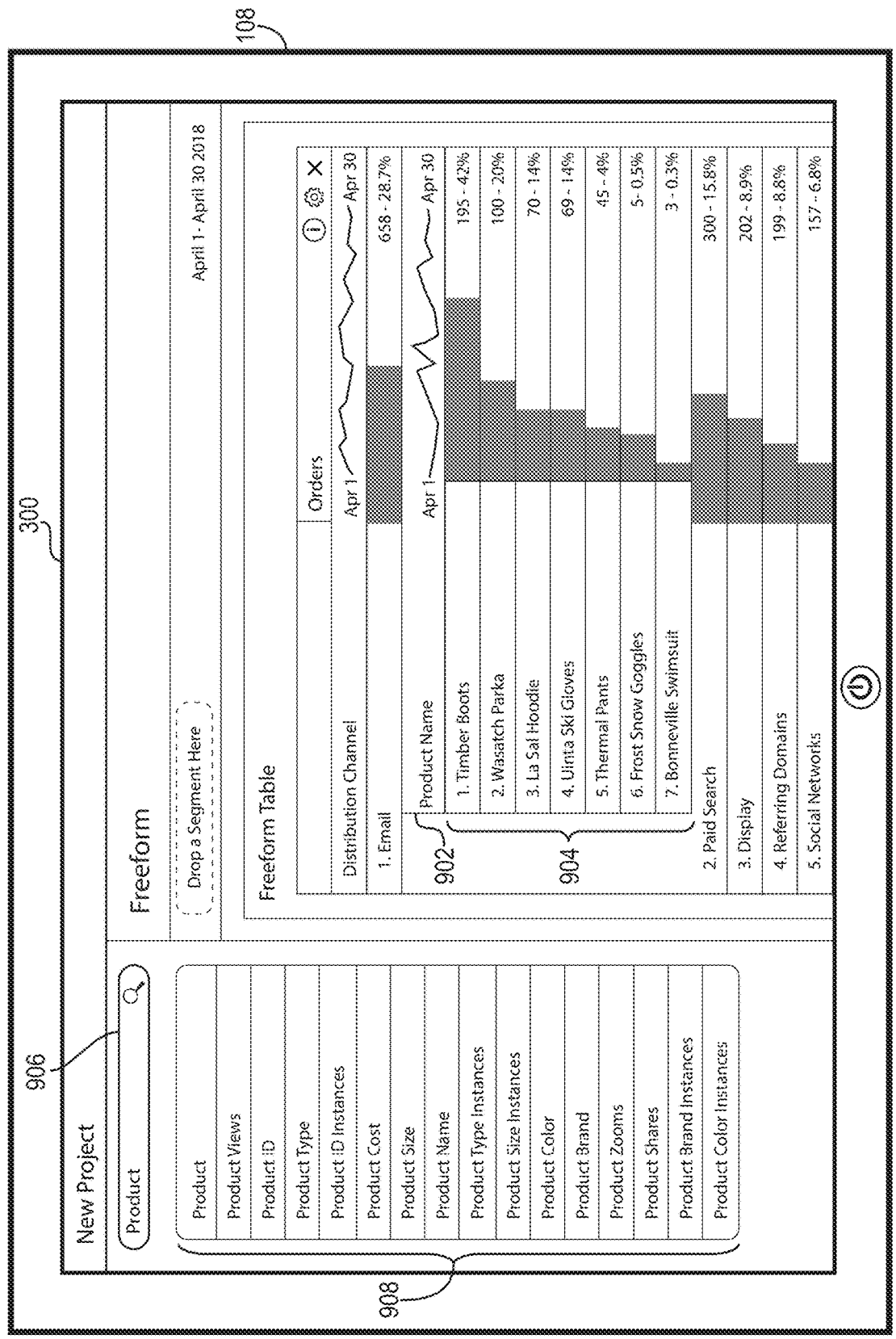
FIG. 9 illustrates an example stacked attribution user interface including a stacked attribution distribution in accordance with one or more embodiments.

As illustrated in FIG. 9, the stacked attribution breakdown system 102 receives user input of a search query within the search bar 906. Based on the search query, the stacked attribution breakdown system 102 provides search results 908 including elements that match the query. In some embodiments, the stacked attribution breakdown system 102 provides elements of a single type (e.g., dimension elements or event category elements), while in other embodiments the stacked attribution breakdown system 102 provides elements of all types that match the query. As shown, the stacked attribution breakdown system 102 receives a user interaction with a "product name" dimension element to modify the stacked attribution distribution by replacing the distribution across distribution channel details with a distribution across product names.

Indeed, FIG. 9 illustrates the dimension 902 ("Product Name") with a number of dimension values 904 (the various product names such as "Timber Boots" and "Wasatch Parka"). The stacked attribution breakdown system 102 generates the stacked attribution distribution by determining, from the subset of orders attributed to the email distribution channel, a number of orders attributable to each product name. Thus, the stacked attribution breakdown system 102 breaks down the orders attributable to the email product category into further detail regarding specific products (e.g., emails/touchpoints regarding specific products). As described, the stacked attribution breakdown system 102 can generate stacked attribution distributions based on other dimension elements as well.

Figure 10:
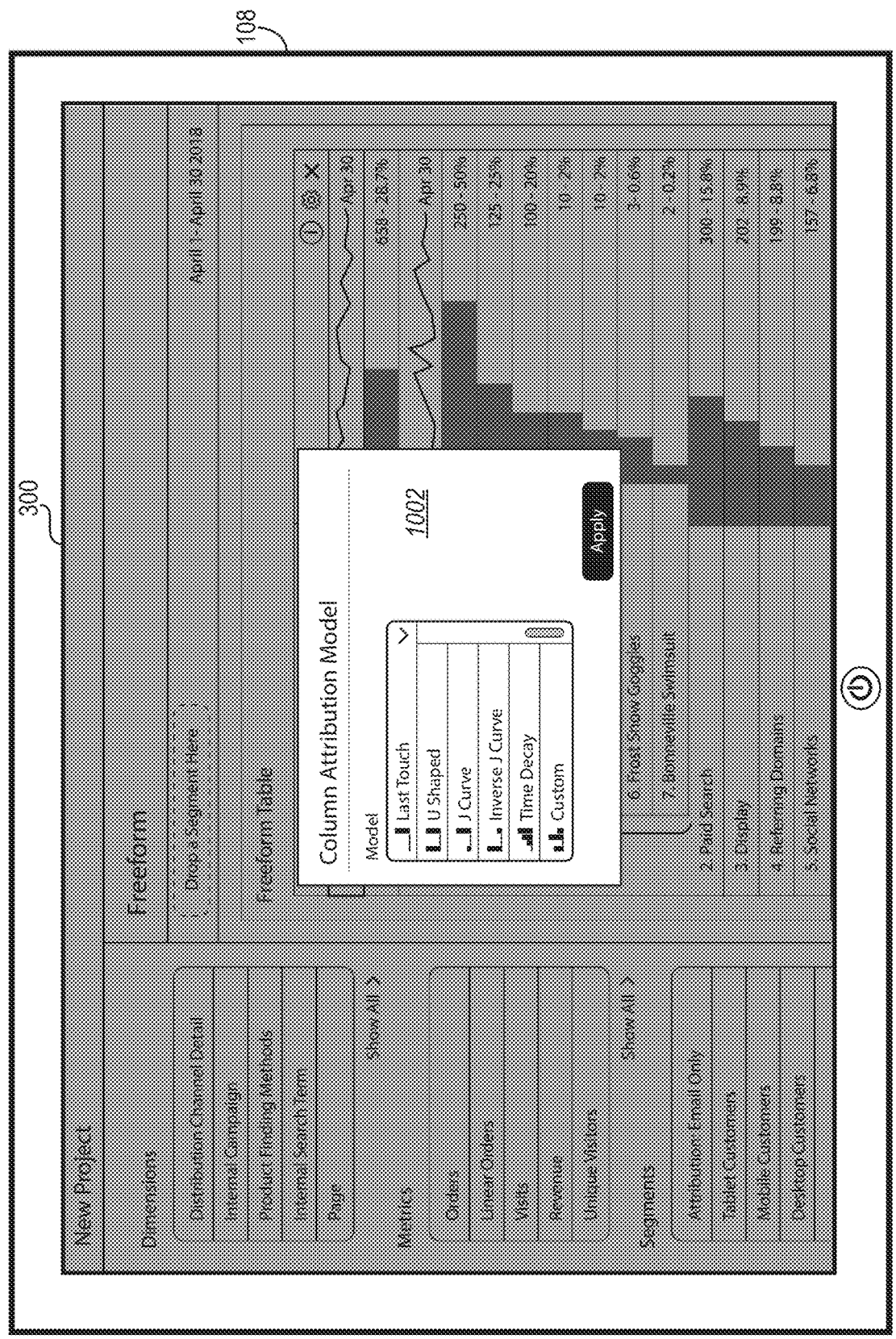
FIG. 10 illustrates an example stacked attribution user interface including attribution model elements in accordance with one or more embodiments.

As mentioned, the stacked attribution breakdown system 102 receives user input to modify stacked attribution distributions. Indeed, FIG. 10 illustrates the stacked attribution user interface 300 including an attribution model window 1002. Similar to the discussion above in relation to FIG. 4, the stacked attribution breakdown system 102 receives a user input to modify preferences associated with the stacked attribution distribution across the dimension values 904. Based on the user input, the stacked attribution breakdown system 102 provides the attribution model window 1002 whereby the user can provide additional input to select one or more attribution model elements. Indeed, the stacked attribution breakdown system 102 receives user interaction with an attribution model element, whereupon the stacked attribution breakdown system 102 applies the corresponding attribution model to generate and/or modify a stacked attribution distribution. For instance, the stacked attribution breakdown system 102 receives a selection of a last touch model, a U-shaped model, a J curve, a custom model, or some other model type.

Indeed, as mentioned above, the stacked attribution breakdown system 102 applies a selected model by accessing information stored within a database (e.g., the database 120). For example, the stacked attribution breakdown system 102 accesses stored user actions/touchpoints and associates events (e.g., orders) to those user actions/touchpoints within the context of a particular dimension and according to a selected attribution model. To illustrate, the stacked attribution breakdown system 102 modifies the stacked attribution distribution across the dimension values 904 of FIG. 9 by applying a different attribution model (e.g., a first touch model, a last touch model, etc.) to attribute the subset of orders (e.g., the 658 "Email" orders) across the dimension values 904.

As also mentioned, the stacked attribution breakdown system 102 generates stacked attribution distributions at multiple levels. For instance, the stacked attribution breakdown system 102 generates attribution distributions for more than one dimension value of a given dimension (e.g., for the email channel and the paid search channel). In addition (or in the alternative), the stacked attribution breakdown system 102 generates attribution distributions stacked within other stacked attribution distributions. In this nested sense, the stacked attribution breakdown system 102 provides tools for users to see information relating to a campaign on a granular, detailed level tailored specifically to what the user selects as dimensions, event categories, and attribution models. The stacked attribution breakdown system 102 further enables users to select multiple types of dimensions, event categories, and/or attribution models as part of a single report—e.g., for presentation within a single interface. For instance, the stacked attribution breakdown system 102 can generate a first-layer attribution distribution based on a first dimension and a first attribution model, and the stacked attribution breakdown system 102 can generate a second-layer (e.g., stacked or nested) attribution distribution within the first-layer distribution utilizing a second dimension and a second attribution model. As further mentioned, the stacked attribution breakdown system 102 generates distributions on the fly responsive to user input provided in real time based on analytics information stored within a database, and the stacked attribution breakdown system 102 therefore does not require the above-mentioned pre-configuration of conventional systems.

Figure 11:
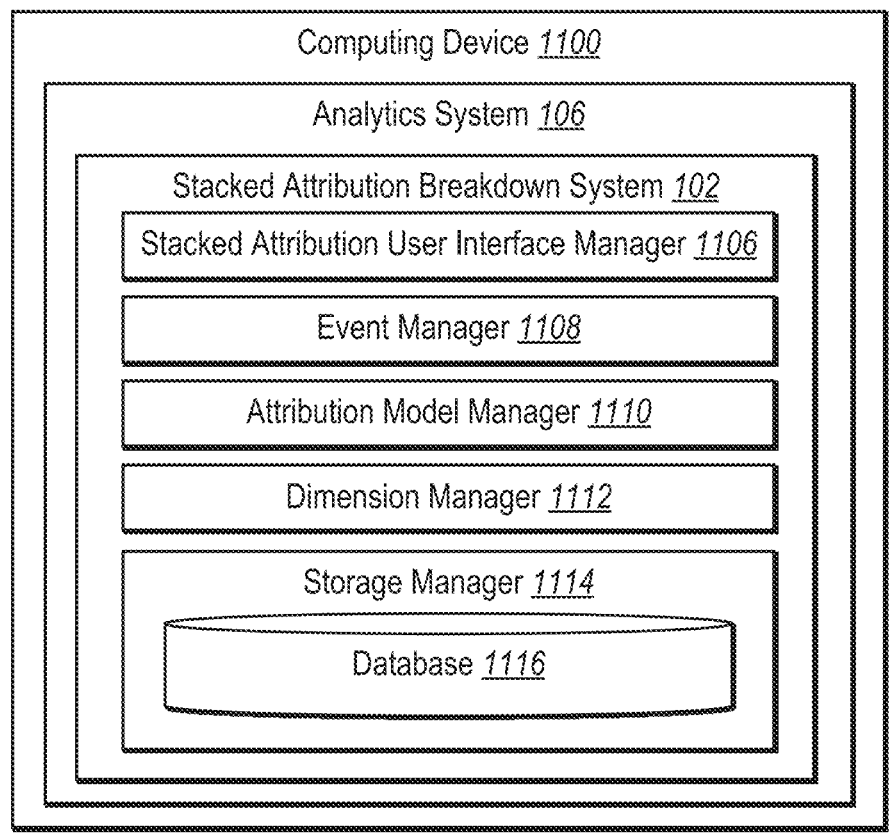
FIG. 11 illustrates a schematic diagram of a stacked attribution breakdown system in accordance with one or more embodiments.

Looking now to FIG. 11, additional detail will be provided regarding components and capabilities of the stacked attribution breakdown system 102. Specifically, FIG. 11 illustrates an example schematic diagram of the stacked attribution breakdown system 102 on an example computing device 1100 (e.g., one or more of the client device 108, the administrator device 116, and/or the server(s) 104). As shown in FIG. 11, the stacked attribution breakdown system 102 may include a stacked attribution user interface manager 1106, an event manager 1108, an attribution model manager 1110, a dimension manager 1112, and a storage manager 114.

As mentioned, the stacked attribution breakdown system 102 includes a stacked attribution user interface manager 1106. In particular, the stacked attribution user interface manager 1106 manages, provides, presents, and/or displays, a stacked attribution user interface. The stacked attribution user interface manager 1106 further receives or detects user input or interactions with various elements of the stacked attribution user interface. For example, the stacked attribution user interface manager 1106 detects user interaction with a dimension element, an event category element, and/or an attribution model element. In addition, the stacked attribution user interface 1106 provides and modifies displays of attribution distributions, including stacked attribution distributions, within the stacked attribution user interface.

As mentioned, the stacked attribution breakdown system 102 includes an event manager 1108. In particular, the event manager 1108 manages, maintains, tracks, monitors, catalogues, and/or stores events associated with a campaign. For example, the event manager 1108 determines which user actions or touchpoints correspond to particular events within event categories. The event manager 1108 further communicates with the storage manager 1114 to access, store, and/or categorize events within the database 1116 (e.g., an example embodiment of the database 120). In some embodiments, the event manager 1108 categorizes observed user actions or touchpoints as events within event categories stored within the database 1116.

As also mentioned, the stacked attribution breakdown system 102 includes an attribution model manager 1110. In particular, the attribution model manager 1110 manages, maintains, implements, applies, and/or utilizes one or more attribution models. For example, the attribution model manager 1110 applies an attribution model to a particular dimension to attribute indicated events to dimension values across the dimension. The attribution model manager 1110 can further generate or modify attribution distributions across dimension values based on identifying new attribution models, dimensions, and/or event categories as described above.

As shown, the stacked attribution breakdown system 102 further includes a dimension manager 1112. In particular, the dimension manager 1112 manages and/or maintains dimensions including dimension values. For example, the dimension manager 1112 communicates with the storage manager 1114 to store dimensions and corresponding dimension values. Accordingly, the dimension manager 1112 can communicate with the event manager 1108 and the attribution model manager 1110 to determine which events correspond to which dimension values.

In one or more embodiments, each of the components of the stacked attribution breakdown system 102 are in communication with one another using any suitable communication technologies. Additionally, the components of the stacked attribution breakdown system 102 can be in communication with one or more other devices including one or more user client devices described above. It will be recognized that although the components of the stacked attribution breakdown system 102 are shown to be separate in FIG. 11, any of the subcomponents may be combined into fewer components, such as into a single component, or divided into more components as may serve a particular implementation. Furthermore, although the components of FIG. 11 are described in connection with the stacked attribution breakdown system 102, at least some of the components for performing operations in conjunction with the stacked attribution breakdown system 102 described herein may be implemented on other devices within the environment.

The components of the stacked attribution breakdown system 102 can include software, hardware, or both. For example, the components of the stacked attribution breakdown system 102 can include one or more instructions stored on a computer-readable storage medium and executable by processors of one or more computing devices (e.g., the computing device 1100). When executed by the one or more processors, the computer-executable instructions of the stacked attribution breakdown system 102 can cause the computing device 1100 to perform the methods described herein. Alternatively, the components of the stacked attribution breakdown system 102 can comprise hardware, such as a special purpose processing device to perform a certain function or group of functions. Additionally or alternatively, the components of the stacked attribution breakdown system 102 can include a combination of computer-executable instructions and hardware.

Furthermore, the components of the stacked attribution breakdown system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the stacked attribution breakdown system 102 may be implemented as part of a stand-alone application on a personal computing device or a mobile device. Alternatively or additionally, the components of the stacked attribution breakdown system 102 may be implemented in any application that allows creation and delivery of marketing content to users, including, but not limited to, applications in ADOBE MARKETING CLOUD, such as ADOBE CAMPAIGN, and ADOBE ANALYTICS. "ADOBE," "MARKETING CLOUD," "CAMPAIGN," and "ANALYTICS" are registered trademarks of Adobe Inc. in the United States and/or other countries.

FIGS. 1-11, the corresponding text, and the examples provide a number of different systems, methods, and non-transitory computer readable media for generating and providing stacked attribution distributions. In addition to the foregoing, embodiments can also be described in terms of flowcharts comprising acts for accomplishing a particular result. For example, FIG. 12 illustrates a flowchart of example sequences of acts in accordance with one or more embodiments.

Figure 12:
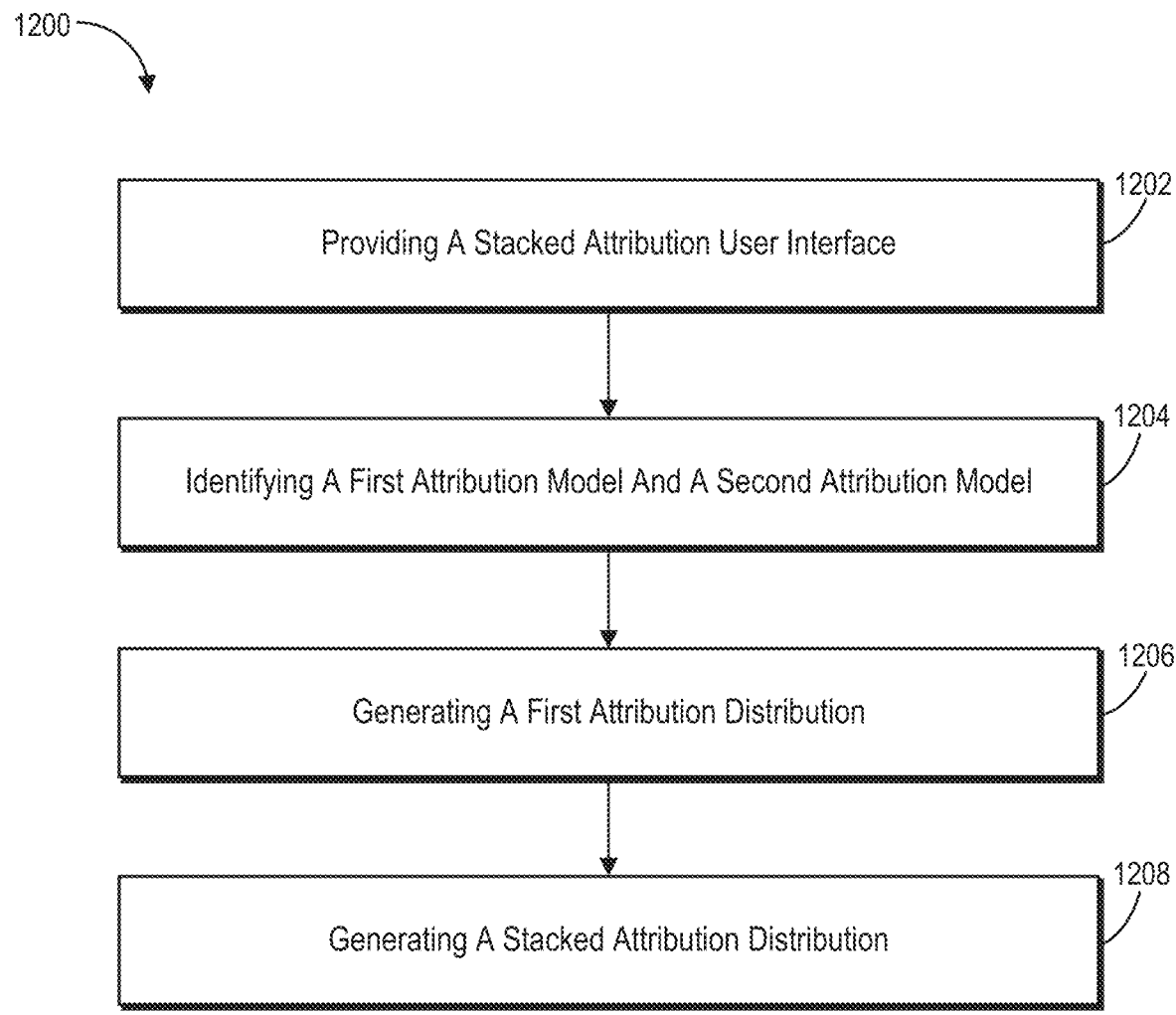
FIG. 12 illustrates a flowchart of a series of acts for generating a stacked attribution distribution in accordance with one or more embodiments.

While FIG. 12 illustrates acts according to respective embodiments, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 of generating and providing a stacked attribution distribution. In particular, the series of acts 1200 includes an act 1202 of providing a stacked attribution user interface. More specifically, the act 1202 can involve providing, for display, a stacked attribution user interface that includes a plurality of attribution model elements corresponding to a plurality of attribution models. The act 1202 can further involve providing, for display, the plurality of attribution model elements corresponding to the plurality of attribution models with a plurality of event category elements and a plurality of dimension elements, wherein the plurality of dimension elements comprise a first dimension element corresponding to the first dimension and a second dimension element corresponding to the second dimension. The plurality of attribution models can include at least two of a first touch model, a last touch model, a linear model, a participation model, a same touch model, a U-shaped model, a J curve model, an inverse J model, a time decay model, or a custom model.

In addition, the series of acts 1200 includes an act 1204 of identifying a first attribution model and a second attribution model. In particular, the act 1204 can include identifying a first attribution model and a second attribution model from the plurality of attribution models.

As shown, the series of acts 1200 further includes an act 1206 of generating a first attribution distribution. In particular, the act 1206 can include generating, for display, via the stacked attribution user interface, a first attribution distribution of events across a first dimension based on the first attribution model, wherein the first attribution distribution includes an attribution of a first subset of the events to a first dimension value from the first dimension. As mentioned, the first dimension can include a distribution channel dimension corresponding to a plurality of distribution channels, and the first dimension value can include a first distribution channel of the plurality of distribution channels.

The series of acts 1200 still further includes an act 1208 of generating a stacked attribution distribution. In particular, the act 1208 can include generating, for display, via the stacked attribution user interface, a stacked attribution distribution of the subset of the events corresponding to the first dimension value across a second dimension based on the second attribution model. The stacked attribution distribution can include an attribution of the subset of the events to a second dimension value from the second dimension.

Although not illustrated, the series of acts 1200 can include an act of receiving a user input by receiving an indication of a selection of an event category element corresponding to the events from the plurality of event category elements, a first dimension element corresponding to the first dimension from the plurality of dimension elements, and a second dimension element corresponding to the second dimension from the plurality of dimension elements. The series of acts 1200 can also include an act of generating the first attribution distribution based on the user input of the event category element and the first dimension element. Additionally or alternatively, the series of acts 1200 can include an act of generating the stacked attribution distribution based on the user input of the second dimension element and user interaction with the first dimension value.

Additionally, the series of acts 1200 can include an act of receiving user input of a third attribution model element corresponding to a third attribution model to modify the first attribution distribution. The series of acts 1200 can also include an act of generating, in response to the user input of the third attribution model, a modified first attribution distribution based on the third attribution model, and a modified stacked attribution distribution based on the second attribution model and the modified first attribution distribution.

The series of acts 1200 can include an act of receiving user input of a third attribution model element corresponding to a third attribution model to modify the stacked attribution distribution. The series of acts 1200 can also include an act of generating, in response to the user input of the third attribution model a modified stacked attribution distribution based on the third attribution model, and an act of providing, for display, the first attribution distribution and the modified stacked attribution distribution.

The series of acts 1200 can include an act of provide, for display, a stacked attribution user interface comprising a plurality of attribution model elements, a plurality of event category elements, and a plurality of dimension elements. The series of acts 1200 can also include an act of, based on user interaction with the stacked attribution user interface, identifying a first attribution model an event category and a first dimension. Further, the series of acts 1200 can include an act of generating for display, in response to the user interaction, a first attribution distribution of events corresponding to the event category across the first dimension based on the first attribution model. The series of acts 1200 can also include an act of, based on additional user interaction with the stacked attribution user interface, identifying a second attribution model, a first dimension value of the first dimension corresponding to a first subset of the events, and a second dimension via the plurality of dimension elements. Additionally, the series of acts 1200 can include an act of, in response to the additional user interaction, generating for display with the first attribution distribution via the stacked attribution user interface, a stacked attribution distribution of the first subset of the events across the second dimension based on the second attribution model.

The first attribution distribution can include a first attribution of a first subset of the events to a first dimension value of the first dimension and a second attribution of a second subset of the events to a second dimension value of the first dimension value. For example, the first attribution distribution can include a distribution of events of corresponding to the event category element across a plurality of distribution channels corresponding to the distribution channel dimension element. Indeed, the first dimension can include distribution channel dimension corresponding to a plurality of distribution channels, and the first dimension value can include a first distribution channel of the plurality of distribution channels. A stacked attribution distribution can include a distribution of a subset of the events corresponding to the event category element across a second dimension.

The series of acts 1200 can also include an act of providing, for display, a plurality of event category elements and a plurality of dimension elements with the plurality of attribution model elements, wherein the plurality of dimension elements include a distribution channel dimension element, and an act of receiving user input of an event category element of the plurality of event category elements and the distribution channel dimension element.

As mentioned, the stacked attribution breakdown system 102 can perform a step for generating a stacked attribution user interface that includes a first attribution distribution reflecting the first attribution model and a stacked attribution distribution reflecting the second attribution model. Indeed, FIG. 13 illustrates exemplary acts in a step for generating the stacked attribution user interface.

Figure 13:
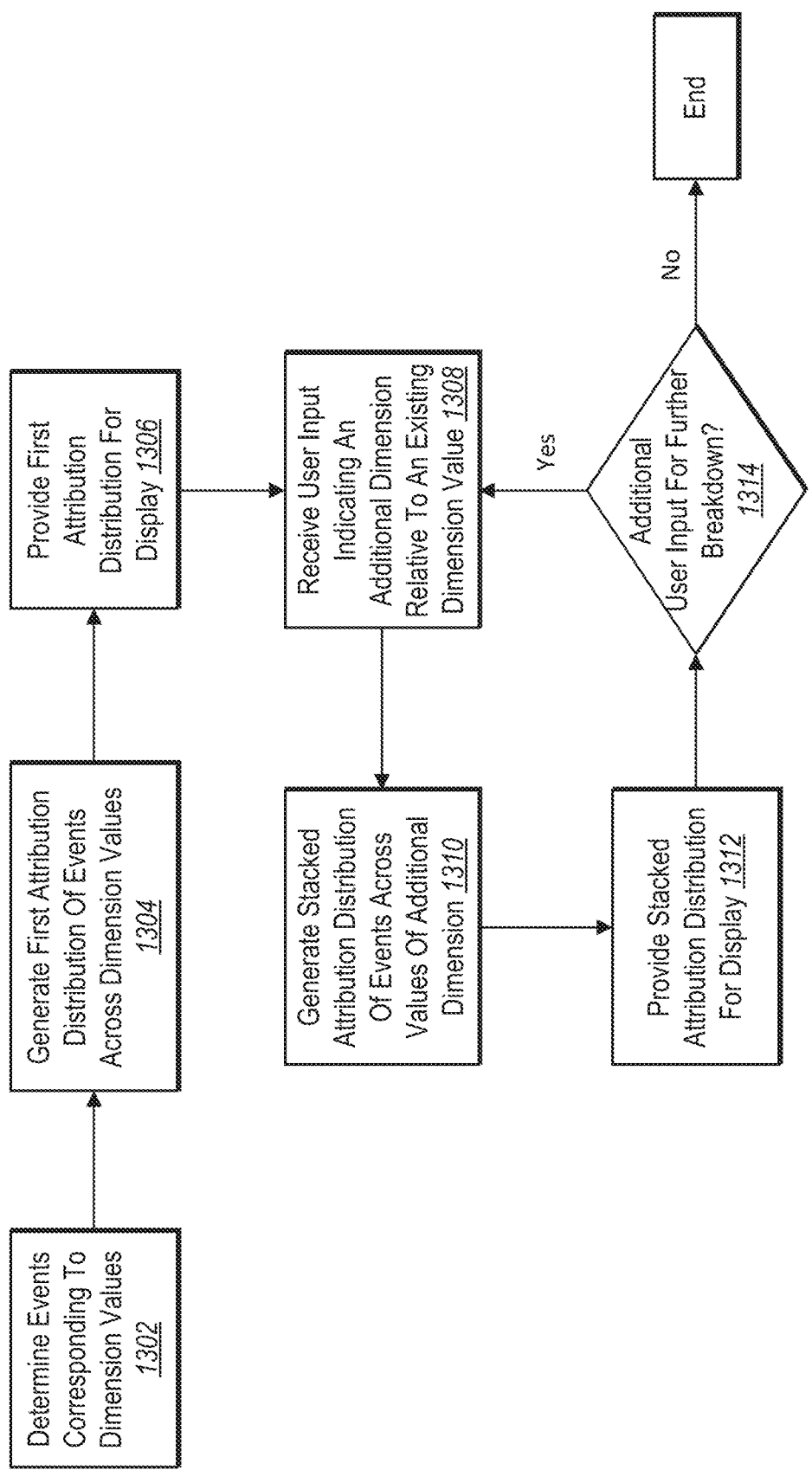
FIG. 13 illustrates a series of acts in a step for generating a stacked attribution user interface comprising a first attribution distribution reflecting the first attribution model and a stacked attribution distribution reflecting the second attribution model in accordance with one or more embodiments.

As shown in FIG. 13, the stacked attribution breakdown system 102 performs an act 1302 of determining events corresponding to dimension values. In particular, as described herein, the stacked attribution breakdown system 102 identifies a dimension and an event category. Based on the dimension and the event category, the stacked attribution breakdown system 102 determines events that correspond to dimension values of the identified dimension. For example, the stacked attribution breakdown system 102 can identify an event category of "orders" and a dimension of "distribution channels." In turn, the stacked attribution breakdown system 102 can identify all orders that correspond to respective distribution channels.

In addition, the stacked attribution breakdown system 102 performs an act 1304 of generating a first attribution distribution of events across dimension values of a first dimension. In particular, as described above, the stacked attribution breakdown system 102 attributes events to dimension values according to an attribution model. For example, the stacked attribution breakdown system 102 can attribute first touch user interactions to events. Thus, the stacked attribution breakdown system 102 generates an attribution distribution based on a first touch model that indicates events relative to individual dimension values.

As illustrated, the stacked attribution breakdown system 102 also performs an act 1306 of providing the first attribution distribution for display. In particular, as described above, the stacked attribution breakdown system 102 provides a stacked attribution user interface that includes the attribution distribution including a display of various dimension values and corresponding attributed events.

As shown, the stacked attribution breakdown system 102 further performs an act 1308 of receiving user input indicating an addition dimension relative to an existing dimension value. In particular, as described above, the stacked attribution breakdown system 102 receives a user interaction with a dimension element within the stacked attribution user interface. For example, the stacked attribution breakdown system 102 receives a user interaction to add a breakdown of a dimension value of the first attribution distribution by applying the additional dimension to that dimension value.

Though not illustrated in FIG. 13, in some embodiments the step for generating the stacked attribution distribution can include an act to identify an attribution model. For example, the stacked attribution breakdown system 102 can receive user input to select an attribution model to apply in conjunction with the additional dimension.

Based on the user interaction, the stacked attribution breakdown system 102 performs an act 1310 of generating a stacked attribution distribution across values of the additional dimension. In particular, the stacked attribution breakdown system 102 determines which events (from a subset of events attributed at the act 1304) correspond to which dimension values of the additional dimension. In a sense, the dimension values of the additional dimension are sub-values of the dimension value of the first attribution distribution. Thus, the stacked attribution breakdown system 102 generates an additional attribution distribution that is stacked or nested within the first dimension value.

In addition, the stacked attribution breakdown system 102 performs an act 1312 to provide the stacked attribution distribution for display. In particular, the stacked attribution breakdown system 102 modifies the stacked attribution user interface to include the stacked attribution distribution of the first attribution distribution (or the attribution distribution corresponding to the dimension value within which the stacked attribution distribution is generated), as described above.

As illustrated, the stacked attribution breakdown system 102 performs an act 1314 of determining 1314 whether there is additional user input for further breakdowns. For example, in some cases the stacked attribution breakdown system 102 receives additional user input to generate a stacked attribution distribution within a dimension value of an existed stacked attribution distribution. Thus, the stacked attribution breakdown system 102 can repeat acts 1308 to 1314 until the stacked attribution breakdown system 102 determines that no additional user interaction indicates further breakdowns.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
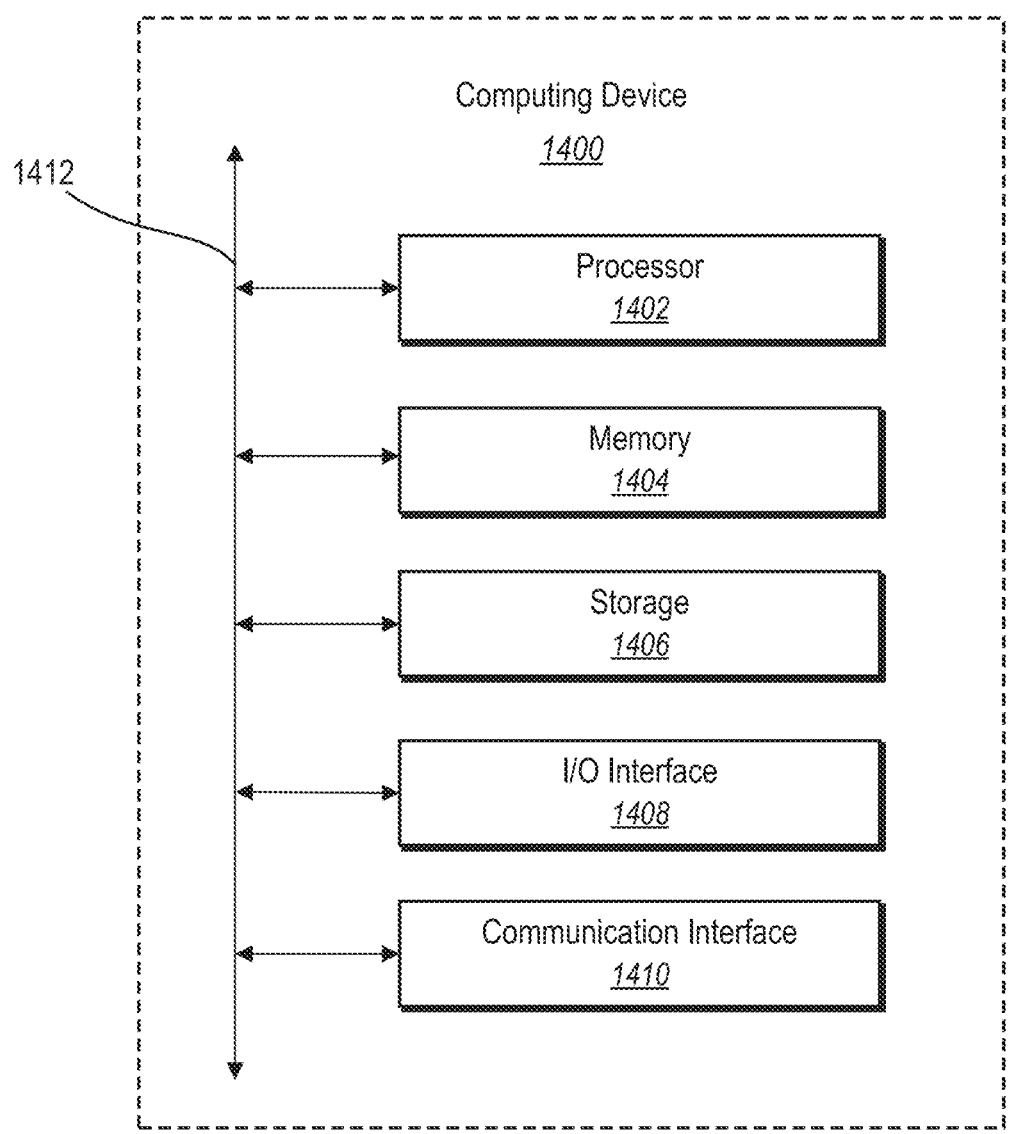
FIG. 14 illustrates a block diagram of an example computing device in accordance with one or more embodiments.

FIG. 14 illustrates, in block diagram form, an example computing device 1400 (e.g., the computing device 1100, the client device 108, the administrator device 116, and/or the server(s) 104) that may be configured to perform one or more of the processes described above. One will appreciate that the stacked attribution breakdown system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for creating and managing digital content campaigns, a computer-implemented method for generating stacked attribution model breakdowns, the computer-implemented method comprising:
   providing, for display, a stacked attribution user interface comprising a plurality of attribution model elements corresponding to a plurality of attribution models;
   identify a first attribution model and a second attribution model from the plurality of attribution models; and
   generate, for display together within the stacked attribution user interface:
      a first attribution distribution, generated via the first attribution model, of events across a first dimension, wherein the first attribution distribution comprises an attribution portion of a first subset of the events corresponding to a first dimension value from the first dimension; and
      a stacked attribution distribution, generated via the second attribution model, nested within the first attribution distribution and depicting a breakdown of the first dimension value across a second dimension to portray respective attribution portions for the first subset of the events.

2. The computer-implemented method of claim 1, further comprising providing, for display via the stacked attribution user interface, a plurality of event category elements and a plurality of dimension elements together with the plurality of attribution model elements, wherein the plurality of dimension elements comprise a distribution channel dimension element.

3. The computer-implemented method of claim 2, further comprising receiving user input of an event category element of the plurality of event category elements and the distribution channel dimension element.

4. The computer-implemented method of claim 3, wherein:
the first attribution distribution comprises a distribution of events of corresponding to the event category element across a plurality of distribution channels corresponding to the distribution channel dimension element; and
the stacked attribution distribution comprises a distribution of a subset of the events corresponding to the event category element across a second dimension.

5. A non-transitory computer readable medium comprising instructions that, when executed by at least one processor, cause a computer device to:
provide, for display, a stacked attribution user interface comprising a plurality of attribution model elements corresponding to a plurality of attribution models;
identify a first attribution model and a second attribution model from the plurality of attribution models; and
generate, for display together within the stacked attribution user interface:
a first attribution distribution of events across a first dimension based on the first attribution model, wherein the first attribution distribution comprises an attribution portion of a first subset of the events corresponding to a first dimension value from the first dimension; and
a stacked attribution distribution nested within the first attribution distribution and depicting a breakdown of the first dimension value across a second dimension to portray respective attribution portions for the first subset of the events based on the second attribution model.

6. The non-transitory computer readable medium of claim 5, wherein the first dimension comprises a distribution channel dimension corresponding to a plurality of distribution channels and the first dimension value comprises a first distribution channel of the plurality of distribution channels.

7. The non-transitory computer readable medium of claim 5, wherein the instructions cause the computer device to provide the stacked attribution user interface by providing the plurality of attribution model elements corresponding to the plurality of attribution models for display together with a plurality of event category elements and a plurality of dimension elements, wherein the plurality of dimension elements comprise a first dimension element corresponding to the first dimension and a second dimension element corresponding to the second dimension.

8. The non-transitory computer readable medium of claim 7, further comprising instructions that, when executed by the at least one processor, cause the computer device to:
receive an indication of a user selection of an event category element from the plurality of event category elements and corresponding to the events of the first attribution distribution;
receive an indication of a user selection of a first dimension element from the plurality of dimension elements and corresponding to the first dimension; and
receive an indication of a user selection of a second dimension element from the plurality of dimension elements and corresponding to the second dimension.

9. The non-transitory computer readable medium of claim 8, wherein the instructions cause the computer device to generate the first attribution distribution based on the user selection of the event category element and the user selection of the first dimension element.

10. The non-transitory computer readable medium of claim 8, wherein the instructions cause the computer device to generate the stacked attribution distribution based on the user selection of the second dimension element and a user interaction to apply the second dimension element to the first dimension value.

11. The non-transitory computer readable medium of claim 5, wherein the stacked attribution distribution comprises an attribution portion of the first subset of the events corresponding to a second dimension value from the second dimension.

12. The non-transitory computer readable medium of claim 5, further comprising instructions that, when executed by the at least one processor, cause the computer device to:
receive a user selection of a third attribution model element corresponding to a third attribution model for modifying the first attribution distribution; and
generate, in response to the user selection of the third attribution model:
a modified first attribution distribution based on the third attribution model; and
a modified stacked attribution distribution based on the second attribution model and the modified first attribution distribution.

13. The non-transitory computer readable medium of claim 5, further comprising instructions that, when executed by the at least one processor, cause the computer device to:
receive a user selection of a third attribution model element corresponding to a third attribution model for modifying the stacked attribution distribution;
generate, in response to the user selection of the third attribution model, a modified stacked attribution distribution based on the third attribution model; and
provide, for display via the stacked attribution user interface, the first attribution distribution and the modified stacked attribution distribution.

14. The non-transitory computer readable medium of claim 5, wherein the plurality of attribution models comprises at least two of a first touch model, a last touch model, a linear model, a participation model, a same touch model, a U-shaped model, a J curve model, an inverse J model, a time decay model, or a custom model.

15. A system comprising:
at least one processor; and
a non-transitory computer readable medium comprising instructions that, when executed by the at least one processor, cause the system to:
provide, for display, a stacked attribution user interface comprising a plurality of attribution model elements corresponding to a plurality of attribution models, a plurality of event category elements, and a plurality of dimension elements;
based on user interaction with the stacked attribution user interface, identify a first attribution model, an event category, and a first dimension;
generate for display, in response to the user interaction, a first attribution distribution generated via the first attribution model and depicting respective attribution portions for events corresponding to the event category across the first dimension;
based on additional user interaction with the stacked attribution user interface, identify a second attribution model, a first dimension value of the first dimension corresponding to a first subset of the events, and a second dimension via the plurality of dimension elements; and in response to the additional user interaction, generate, via the second attribution model and for display nested within the first attribution distribution as part of the stacked attribution user interface, a stacked attribution distribution depicting a breakdown of the first dimension value across the second dimension to portray respective attribution portions for the first subset of the events.

16. The system of claim 15, further comprising instructions that, when executed by the at least one processor, cause the system to:

receive a user selection of a third attribution model element corresponding to a third attribution model to modify the first attribution distribution; and generate, in response to the user selection of the third attribution model:
  a modified first attribution distribution based on the third attribution model; and
  a modified stacked attribution distribution based on the second attribution model and the modified first attribution distribution.

17. The system of claim 15, wherein the first attribution distribution further comprises a first attribution portion for a first subset of the events corresponding to a first dimension value of the first dimension and a second attribution portion for a second subset of the events corresponding to a second dimension value of the first dimension.

18. The system of claim 15, further comprising instructions that, when executed by the at least one processor, cause the system to receive an input to modify one or more of the first attribution model or the second attribution model to a third attribution model.

19. The system of claim 15, wherein the plurality of attribution models comprises at least two of a first touch model, a last touch model, a linear model, a participation model, a same touch model, a U-shaped model, a J curve model, an inverse J model, a time decay model, or a custom model.

20. The system of claim 15, wherein:
the first attribution model comprises a first touch model; and
the second attribution model comprises a last touch model.

* * * * *